United States Patent [19]

Hachiya et al.

[11] Patent Number: 5,723,068
[45] Date of Patent: Mar. 3, 1998

[54] LIQUID CRYSTAL COMPOSITION AND A LIQUID CRYSTAL DISPLAY DEVICE CONTAINING THE SAME

[75] Inventors: Norihisa Hachiya; Etsuo Nakagawa; Toyoshiro Isoyama; Tetsuya Matsushita, all of Chibaken, Japan

[73] Assignee: Chisso Corporation, Osakafu, Japan

[21] Appl. No.: 608,523

[22] Filed: Feb. 28, 1996

[30] Foreign Application Priority Data

Mar. 2, 1995 [JP] Japan .................. 7-068763

[51] Int. Cl.$^6$ .................. C09K 19/34; C09K 19/12; G02F 1/13
[52] U.S. Cl. .................. 252/299.63; 252/299.66; 252/299.01; 252/299.67; 349/182
[58] Field of Search .................. 252/299.01, 299.67, 252/299.63, 299.66; 349/182

[56] References Cited

U.S. PATENT DOCUMENTS

| | | | |
|---|---|---|---|
| 5,167,860 | 12/1992 | Sawada et al. | 252/299.63 |
| 5,468,421 | 11/1995 | Matsui et al. | 252/299.63 |

OTHER PUBLICATIONS

CAplus 1994: 311802 Abstract.
CAplus 1993: 592332 Abstract.

*Primary Examiner*—Shean C. Wu
*Attorney, Agent, or Firm*—Wenderoth, Lind & Ponack

[57] ABSTRACT

A LC composition for active matrix addressed display mode having a high voltage holding ratio and a reduced threshold voltage is provided, which composition contains:

a first component consisting at least one compound of following formula (1) and a second component consisting at least one compound selected from the group of compounds of formulas (4), (5) and (6):

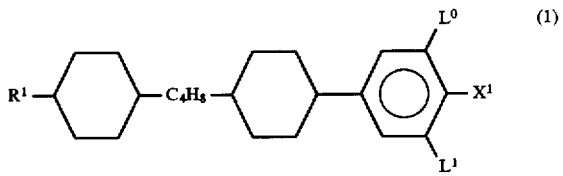

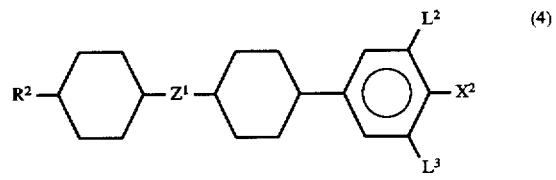

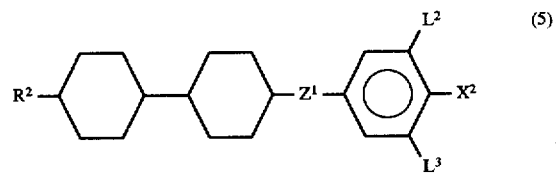

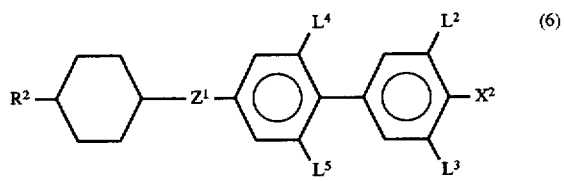

wherein $R^1$ and $R^2$ represent $C_{1-10}$ alkyl; $X^1$ and $X^2$ represent F, $CF_3$, or $OCF_3$; $L^0$–$L^5$ represent H or F; and $Z^1$ represents a single bond or —$CH_2CH_2$—.

16 Claims, No Drawings

LIQUID CRYSTAL COMPOSITION AND A LIQUID CRYSTAL DISPLAY DEVICE CONTAINING THE SAME

BACKGROUND OF THE INVENTION (1) Field of the Invention

The present invention relates to a liquid crystal composition and to a LC display device. More specifically, it relates to a LC composition for an active matrix addressing mode display device (hereinafter often abbreviated to AM-LCD) and to an AM-LCD.

(2) Description of the Related Art

A liquid crystal display device (LCD) has been used in a portable electronic calculator, a digital watch and clock and so forth, since its electric power consumption is smaller than a cathode ray tube (CRT) and it is possible to reduce volume and mass of the display device. Among various liquid crystal display modes, most expected is an AM-LCD which employs an active circuit element such as a thin film transistor and the like, because a fine display (having high contrast) in color is believed attainable in the AM-LCD.

A liquid crystal material for a LCD is required to have as wide a mesomorphic temperature range as possible, sufficient stability for use condition, and also physical properties which satisfy driving conditions of a LCD employing the LC material.

However, no single liquid crystal compound has been found that satisfies those conditions as above. Thus, there is employed as display materials at present a liquid crystal composition prepared by mixing several liquid crystal compounds with one another or with non-liquid crystalline compounds in order to have those various properties as required.

A liquid crystal composition for a conventional AM-LCD has been required to have, (1) a high specific resistance at use temperature and characteristics to produce a high voltage holding ratio when used in a display element, in order to maintain a high contrast in a LCD;

(2) a high nematic-isotropic phase transition temperature (hereinafter often abbreviated to NI point), in order to broaden a temperature range in which a LCD is used; and the like properties.

As a driving mode, AM-LCD employs a TN display mode in which aligning directions of liquid crystal molecules at each inner surface of a pair of substrates are twisted by 90° in a liquid crystal cell. A LCD has recently been used in portable personal computers which must be small in size and light in weight. A LCD for portable use is required to be driven by a light and small-sized source of electricity. In order to satisfy this requirement, a liquid crystal material for a portable personal computer should have a low threshold voltage as an electro-optical characteristic. Several methods are considered for lowering the threshold voltage. Supposing a case in 90° twisted nematic mode LCD, a threshold voltage $V_c$ in electro-capacity characteristic is given by the following equation including a dielectric anisotropy $\Delta\epsilon$, and three terms of elastic coefficient $K_{11}$, $K_{22}$ and $K_{33}$:

$$Vc = \pi \sqrt{\frac{K_{11} + (K_{33} - 2K_{22})/4}{\epsilon_0 \cdot \Delta\epsilon}}$$

which shows that a LC material having a large positive $\Delta\epsilon$ is effective in lowering a threshold voltage $V_c$. Namely, the larger the $\Delta\epsilon$ is, the lower becomes the $V_c$ in this case.

As one of the prior arts, Japanese patent application laid-open No. Hei 2-289682 discloses a liquid crystal composition having various features of a low viscosity, a suitably positive dielectric anisotropy, high reliability and a high contrast in display together with low electric consumption and a high specific resistance. The disclosed composition may be used for an AM-LCD since it has a high specific resistance and a display device using this composition shows a high voltage holding ratio, however, the composition still has a defect of a high threshold voltage. Hence it is too deficient to be employed in a portable AM-LCD. As mentioned above, the present status of the art for a liquid crystal composition for an AM-LCD is that there is a desire for a LC composition which has a high voltage holding ratio at a use temperature range and is driven at a low voltage.

SUMMARY OF THE INVENTION

Based on the preceding, an object of the present invention is to provide a liquid crystal composition for an AM-LCD which has a high voltage holding ratio in a use temperature range and a reduced threshold voltage.

The present invention in a first aspect resides in (1) a liquid crystal composition comprising:

a first component consisting of at least one compound selected from the group consisting of compounds expressed by general formula (1):

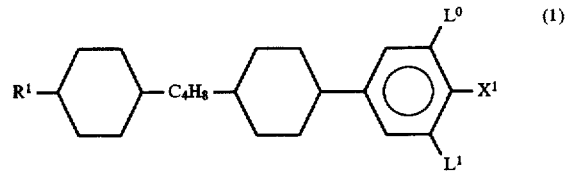

(1)

wherein $R^1$ represents an alkyl group of 1 to 10 carbon atoms; $X^1$ represents F, $CF_3$ or $OCF_3$; and $L^0$ and $L^1$ represent independently H or F, and a second component consisting of at least one compound selected from the group consisting of compounds expressed by any one of general formulas (2), (3), (4), (5), (6) and (7):

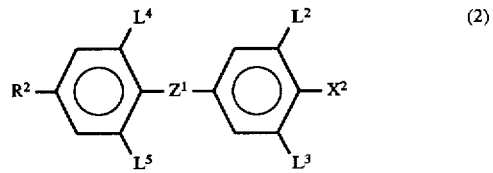

(2)

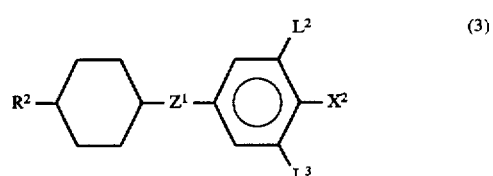

(3)

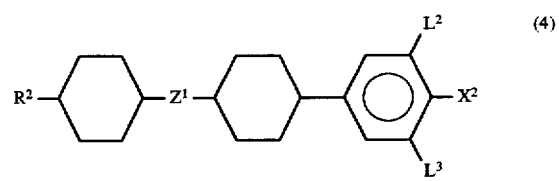

(4)

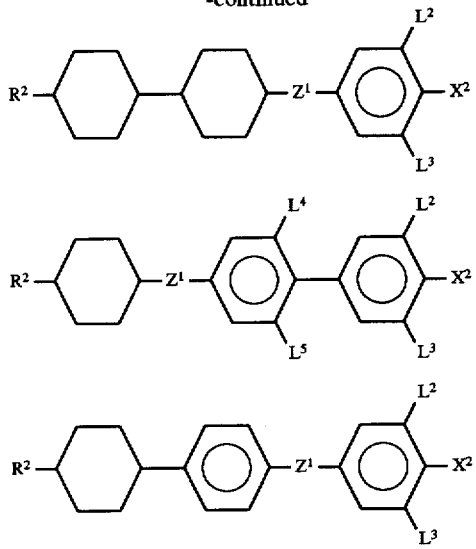

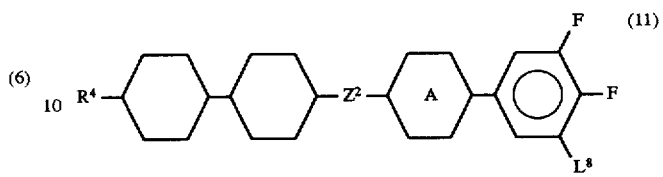

wherein $R^2$ represents an alkyl group of 1 to 10 carbon atoms; $Z^1$ represents —$CH_2CH_2$— or a single bond; $X^2$ represents F, $CF_3$, $OCHF_2$, $OCF_3$, $OCF_2CHF_2$ or $OCF_2CHFCF_3$; and $L^2$, $L^3$, $L^4$ and $L^5$ represent independently H or F.

A preferable embodiment of the invention resides in (2) a liquid crystal composition as defined in the previous item, wherein mixing proportions of the first and second components are 3–50% and 30–97%, each by weight, respectively, based upon the total weight of the composition.

Another preferable embodiment of the invention resides in (3) a liquid crystal composition defined in any of the previous item (1) or item (2), wherein, in formulas (2)–(7), $X^2$ is F, $OCF_3$, $OCHF_2$, $OCF_2CHF_2$ or $OCF_2CHFCF_3$.

Another embodiment of the present invention resides in (4) a liquid crystal composition as defined in any of the previous items (1) through (3), further comprising a third component consisting of at least one compound selected from the group consisting of compounds expressed by any one of general formulas (8), (9) and (10):

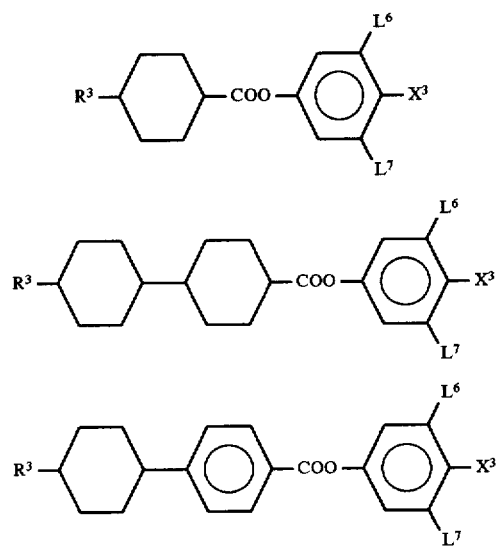

wherein $R^3$ represents an alkyl group of 1 to 10 carbon atoms; $L^6$ and $L^7$ represent independently H or F; and $X^3$ represents F or $OCF_3$.

A still another embodiment of the invention resides in (5) a liquid crystal composition as defined in any of items (1) through (3), further comprising a third component consisting of at least one compound selected from the group consisting of compounds expressed by general formula (11):

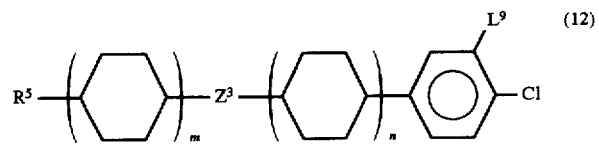

wherein $R^4$ represents an alkyl group of 1 to 10 carbon atoms; $Z^2$ represents —$CH_2CH_2$— or single bond; six-membered ring A represents trans-1,4-cyclohexylene or 1,4-phenylene; and $L^8$ represents H or F.

A still another embodiment of the invention resides in (6) a liquid crystal composition as defined in any of the previous items (1) through (3), further comprising a third component consisting of at least one compound selected from the group consisting of compounds expressed by general formula (12):

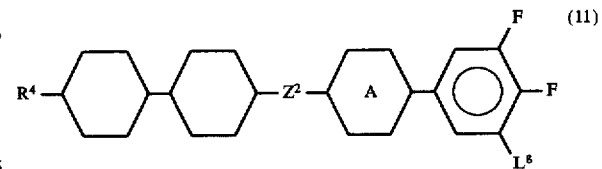

wherein $R^5$ represents an alkyl group of 1 to 10 carbon atoms; $Z^3$ represents —$CH_2CH_2$— or a single bond; $L^9$ represents H or F; m and n each represent independently 0 or 1; and (m+n) is 1 or 2.

A still another embodiment of the invention resides in (7) a liquid crystal composition as defined by item (4), further comprising a fourth component consisting of at least one compound selected from the group consisting of compounds expressed by general formula (11):

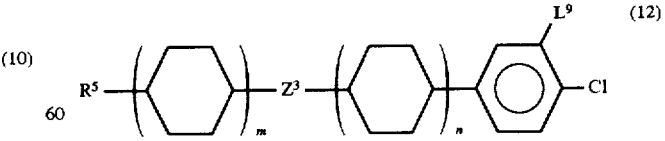

wherein $R^4$ represents an alkyl group of 1 to 10 carbon atoms; $Z^2$ represents —$CH_2CH_2$— or single bond; six-membered ring A represents trans-1,4-cyclohexylene or 1,4-phenylene; and $L^8$ represents H or F.

(8) a liquid crystal composition as defined in any of the previous item (4), item (5) or item (7), further comprising a fourth or additional component consisting of at least one compound selected from the group consisting of compounds expressed by general formula (12):

wherein $R^5$ represents an alkyl group of 1 to 10 carbon atoms; $Z^3$ represents —$CH_2CH_2$— or a single bond; $L^9$ represents H or F; m and n each represent independently 0 or 1; and (m+n) is 1 or 2.

A still another embodiment of the invention resides in (9) a liquid crystal composition as defined in any of items (1)

through (3), further comprising a third component consisting of at least one compound selected from the group consisting of compounds expressed by any one of general formulas (13), (14) and (15):

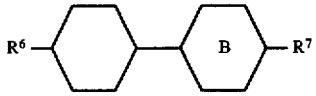

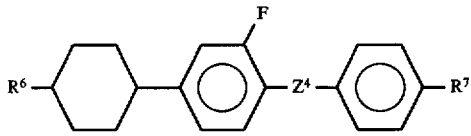

wherein $R^6$ and $R^7$ represent independently an alkyl group, an alkoxy group or an oxalkyl group, each of 1 to 10 carbon atoms; $Z^4$ represents —CH═CH— or —C≡C—; and six-membered rings B and C represent independently trans-1, 4-cyclohexylene or 1,4-phenylene.

A still another embodiment of the invention resides in (10) a liquid crystal composition as defined in any of items (4) through (6), further comprising a fourth component consisting of at least one compound selected from the group consisting of compounds expressed by any one of general formulas (13), (14) and (15):

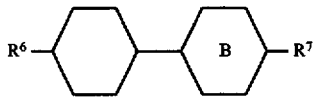

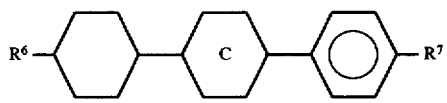

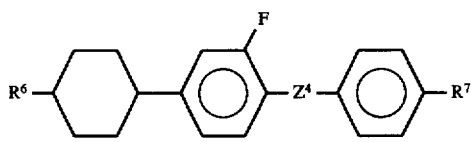

wherein $R^6$ and $R^7$ represent independently an alkyl group, an alkoxy group or an oxalkyl group, each of 1 to 10 carbon atoms; $Z^4$ represents —CH═CH— or —C≡C—; and six-membered rings B and C represent independently trans-1, 4-cyclohexylene or 1,4-phenylene.

A still another embodiment of the invention resides in (11) a liquid crystal composition as defined in item (7), further comprising a fifth component consisting of at least one compound selected from the group consisting of compounds expressed by any one of general formulas (13), (14) and (15):

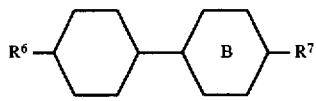

wherein $R^6$ and $R^7$ represent independently an alkyl group, an alkoxy group or an oxalkyl group, each of 1 to 10 carbon atoms; $Z^4$ represents —CH═CH— or —C≡C—; and six-membered rings B and C represent independently trans-1, 4-cyclohexylene or 1,4-phenylene.

A still another embodiment of the invention resides in (12) a liquid crystal composition as defined in item (8), further comprising an additional component consisting of at least one compound selected from the group consisting of compounds expressed by any one of general formulas (13), (14) and (15):

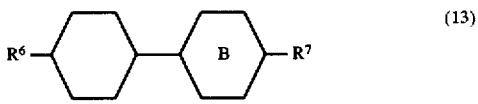

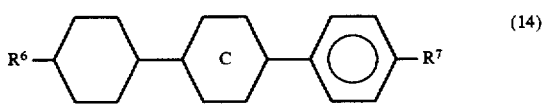

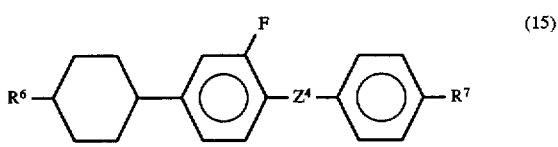

wherein $R^6$ and $R^7$ represent independently an alkyl group, an alkoxy group or an oxalkyl group, each of 1 to 10 carbon atoms; $Z^4$ represents —CH═CH— or —C≡C—; and six-membered rings B and C represent independently trans-1, 4-cyclohexylene or 1,4-phenylene.

The present invention in the second aspect resides in (13) a liquid crystal display device comprising a liquid crystal composition as set forth in any one of the previous items (1) through (12).

DESCRIPTION OF THE PREFERRED EMBODIMENTS

Compounds consisting of each of the components will be illustrated below. Compounds of formulas (1) through (15) are already known by a skilled person and are available.

A compound of general formula (1) has a large $\Delta\epsilon$ and high chemical stability, and functions as an important LC material which reduces a threshold voltage of the resulting composition, maintaining a high voltage holding ratio of the device at use temperature. As compounds of formula (1), those expressed by each of the following general formulas are preferably used:

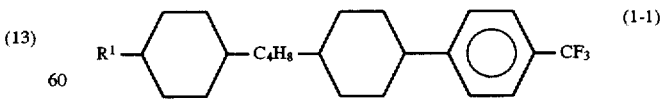

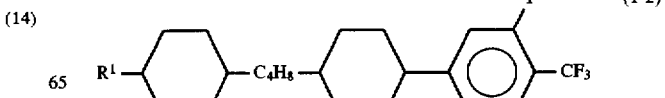

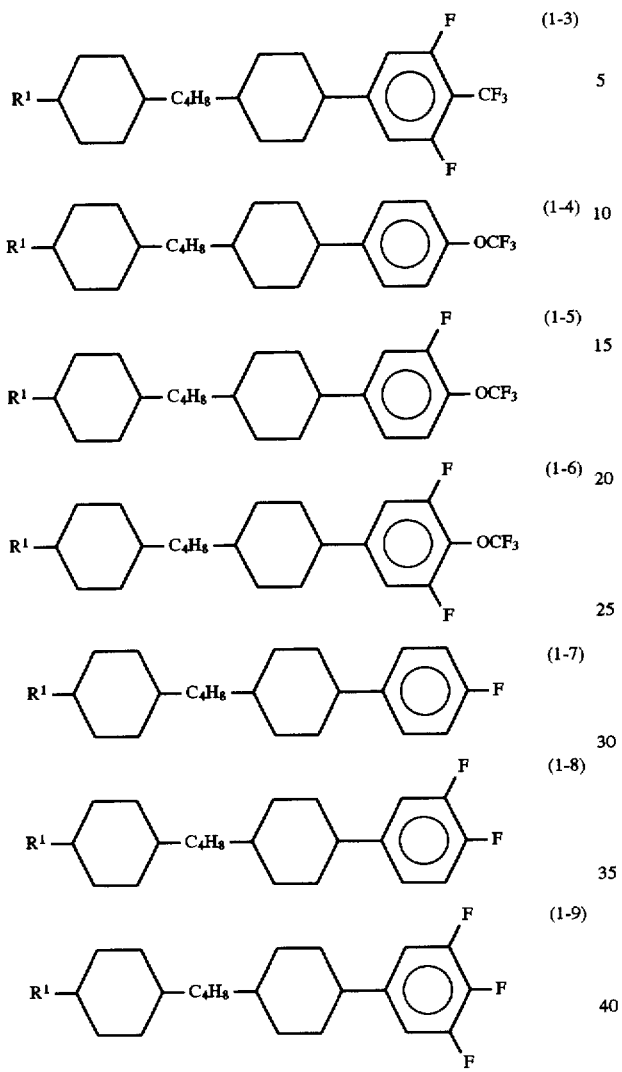

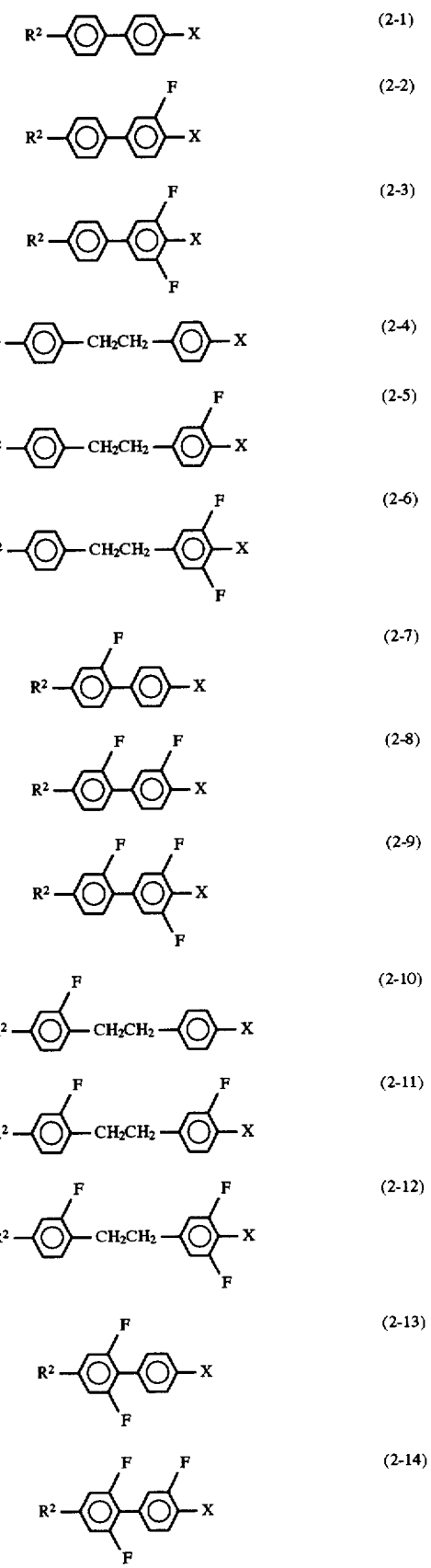

wherein $R^1$ represents an alkyl group of 1 to 10 carbon atoms. Among those of formulas (1-1) through (1-9), more preferably used in the present invention are compounds expressed by formula (1-3), formula (1-4) or formula (1-9).

Compounds expressed by each of general formulas (2) through (7) have a positive dielectric anisotropy and are superior in thermal and chemical stabilities. Those compounds are very important in the preparation of a LC composition for an AM-LCD which requires characteristics such as a particularly high voltage holding ratio and a high specific resistance.

Among those compounds, compounds having two six-membered rings are used in the present invention with a chief aim of adjusting a driving voltage and/or a viscosity of the resulting composition. Compounds having three six-membered rings are employed in the present composition with a chief aim of adjusting a clearing point and nematic range of the resulting composition, and/or with an aim of adjusting a driving voltage, a Δn and/or a viscosity thereof. As compounds of formulas (2) through (7), those expressed by each of the following formulas are preferably used in the present invention.

| | | | |
|---|---|---|---|
| R²-⟨F,F⟩-CH₂CH₂-⟨⟩-X | (2-15) | R²-⟨H⟩-⟨F⟩-OCF₂CF₂H | (3-14) |
| R²-⟨F,F⟩-CH₂CH₂-⟨F⟩-X | (2-16) | R²-⟨H⟩-⟨F,F⟩-OCF₂CF₂H | (3-15) |
| R²-⟨H⟩-⟨⟩-F | (3-1) | R²-⟨H⟩-⟨⟩-OCF₂CFHCF₃ | (3-16) |
| R²-⟨H⟩-⟨F⟩-F | (3-2) | R²-⟨H⟩-⟨F⟩-OCF₂CFHCF₃ | (3-17) |
| R²-⟨H⟩-⟨F,F⟩-F | (3-3) | R²-⟨H⟩-⟨F,F⟩-OCF₂CFHCF₃ | (3-18) |
| R²-⟨H⟩-⟨⟩-CF₃ | (3-4) | R²-⟨H⟩-CH₂CH₂-⟨⟩-F | (3-19) |
| R²-⟨H⟩-⟨F⟩-CF₃ | (3-5) | R²-⟨H⟩-CH₂CH₂-⟨F⟩-F | (3-20) |
| R²-⟨H⟩-⟨F,F⟩-CF₃ | (3-6) | R²-⟨H⟩-CH₂CH₂-⟨F,F⟩-F | (3-21) |
| R²-⟨H⟩-⟨⟩-OCF₃ | (3-7) | R²-⟨H⟩-CH₂CH₂-⟨⟩-CF₃ | (3-22) |
| R²-⟨H⟩-⟨F⟩-OCF₃ | (3-8) | R²-⟨H⟩-CH₂CH₂-⟨F⟩-CF₃ | (3-23) |
| R²-⟨H⟩-⟨F,F⟩-OCF₃ | (3-9) | R²-⟨H⟩-CH₂CH₂-⟨F,F⟩-CF₃ | (3-24) |
| R²-⟨H⟩-⟨⟩-OCHF₂ | (3-10) | R²-⟨H⟩-CH₂CH₂-⟨⟩-OCF₃ | (3-25) |
| R²-⟨H⟩-⟨F⟩-OCHF₂ | (3-11) | R²-⟨H⟩-CH₂CH₂-⟨F⟩-OCF₃ | (3-26) |
| R²-⟨H⟩-⟨F,F⟩-OCHF₂ | (3-12) | R²-⟨H⟩-CH₂CH₂-⟨F,F⟩-OCF₃ | (3-27) |
| R²-⟨H⟩-⟨⟩-OCF₂CF₂H | (3-13) | R²-⟨H⟩-CH₂CH₂-⟨⟩-OCHF₂ | (3-28) |
| | | R²-⟨H⟩-CH₂CH₂-⟨F⟩-OCHF₂ | (3-29) |

| | |
|---|---|
| R²—⬡—CH₂CH₂—⌬(2F,6F)—OCHF₂ (3-30) | R²—⬡—⬡—⌬(2F,6F)—OCF₃ (4-9) |
| R²—⬡—CH₂CH₂—⌬—OCF₂CF₂H (3-31) | R²—⬡—⬡—⌬—OCHF₂ (4-10) |
| R²—⬡—CH₂CH₂—⌬(2F)—OCF₂CF₂H (3-32) | R²—⬡—⬡—⌬(2F)—OCHF₂ (4-11) |
| R²—⬡—CH₂CH₂—⌬(2F,6F)—OCF₂CF₂H (3-33) | R²—⬡—⬡—⌬(2F,6F)—OCHF₂ (4-12) |
| R²—⬡—CH₂CH₂—⌬—OCF₂CFHCF₃ (3-34) | R²—⬡—⬡—⌬—OCF₂CF₂H (4-13) |
| R²—⬡—CH₂CH₂—⌬(2F)—OCF₂CFHCF₃ (3-35) | R²—⬡—⬡—⌬(2F)—OCF₂CF₂H (4-14) |
| R²—⬡—CH₂CH₂—⌬(2F,6F)—OCF₂CFHCF₃ (3-36) | R²—⬡—⬡—⌬(2F,6F)—OCF₂CF₂H (4-15) |
| R²—⬡—⬡—⌬—F (4-1) | R²—⬡—⬡—⌬—OCF₂CFHCF₃ (4-16) |
| R²—⬡—⬡—⌬(2F)—F (4-2) | R²—⬡—⬡—⌬(2F)—OCF₂CFHCF₃ (4-17) |
| R²—⬡—⬡—⌬(2F,6F)—F (4-3) | R²—⬡—⬡—⌬(2F,6F)—OCF₂CFHCF₃ (4-18) |
| R²—⬡—⬡—⌬—CF₃ (4-4) | R²—⬡—CH₂CH₂—⬡—⌬—F (4-19) |
| R²—⬡—⬡—⌬(2F)—CF₃ (4-5) | R²—⬡—CH₂CH₂—⬡—⌬(2F)—F (4-20) |
| R²—⬡—⬡—⌬(2F,6F)—CF₃ (4-6) | R²—⬡—CH₂CH₂—⬡—⌬(2F,6F)—F (4-21) |
| R²—⬡—⬡—⌬—OCF₃ (4-7) | R²—⬡—CH₂CH₂—⬡—⌬—CF₃ (4-22) |
| R²—⬡—⬡—⌬(2F)—OCF₃ (4-8) | R²—⬡—CH₂CH₂—⬡—⌬(2F)—CF₃ (4-23) |

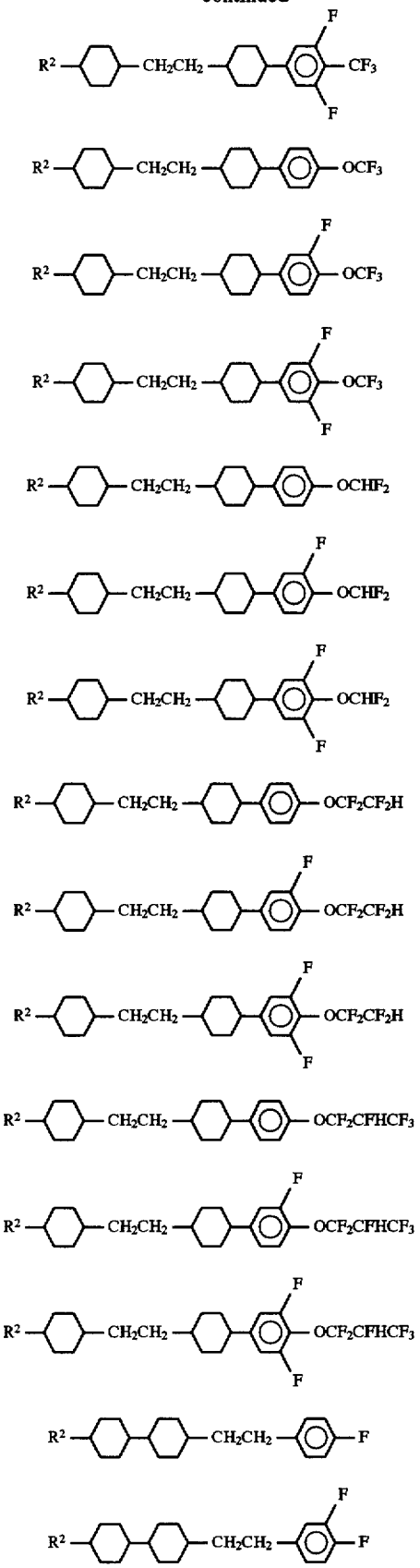
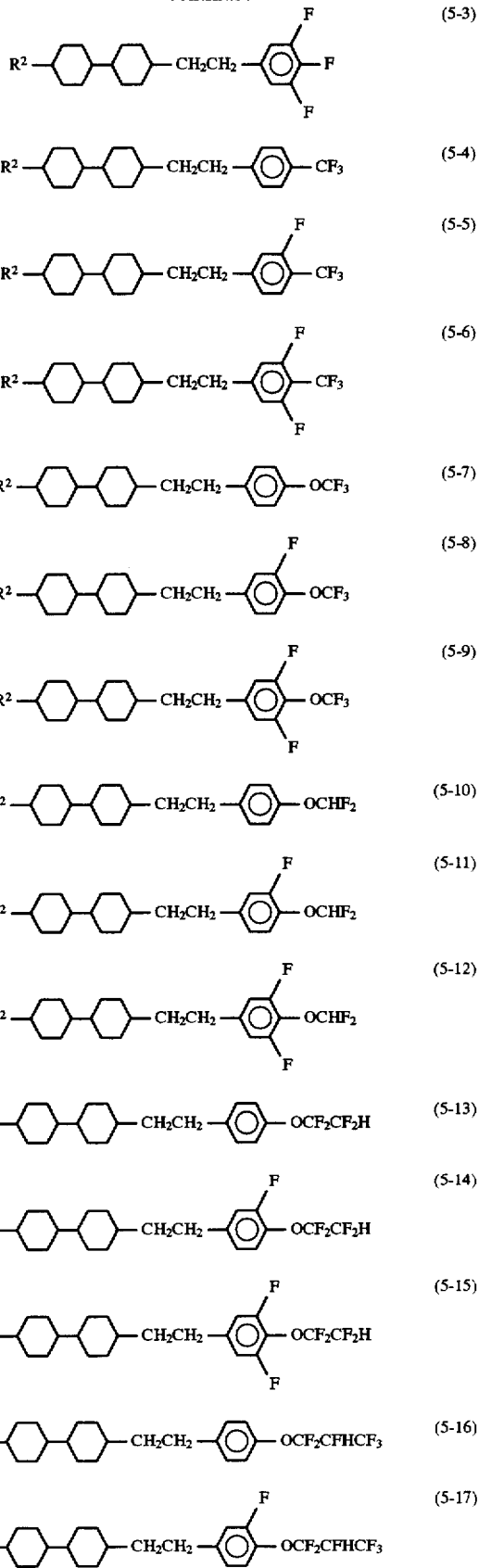

-continued
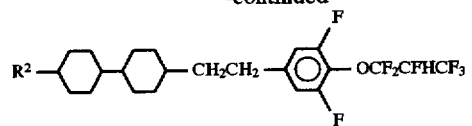 (5-18)
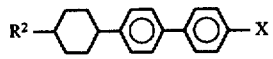 (6-1)
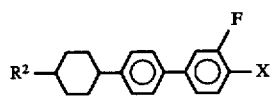 (6-2)
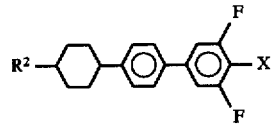 (6-3)
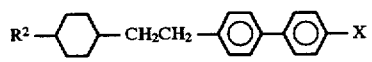 (6-4)
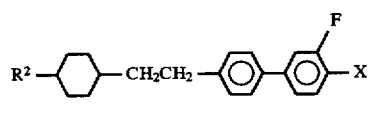 (6-5)
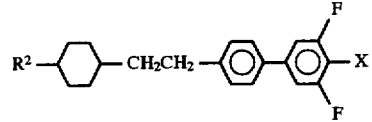 (6-6)
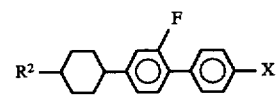 (6-7)
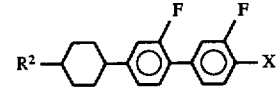 (6-8)
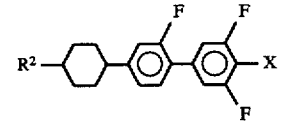 (6-9)
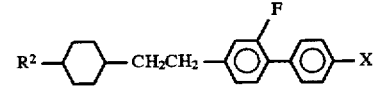 (6-10)
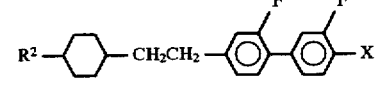 (6-11)
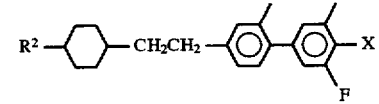 (6-12)
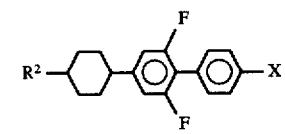 (6-13)
-continued
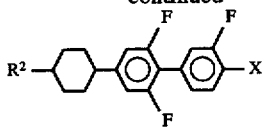 (6-14)
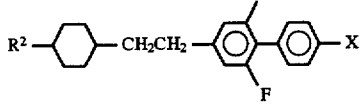 (6-15)
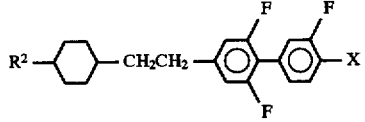 (6-16)
(7-1)
(7-2)
(7-3)
(7-4)
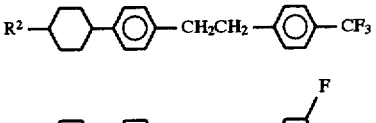 (7-5)
(7-6)
(7-7)
 (7-8)
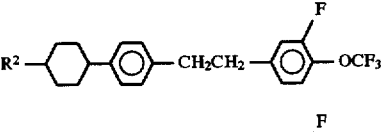 (7-9)
(7-10)
 (7-11)
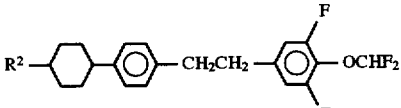 (7-12)

-continued

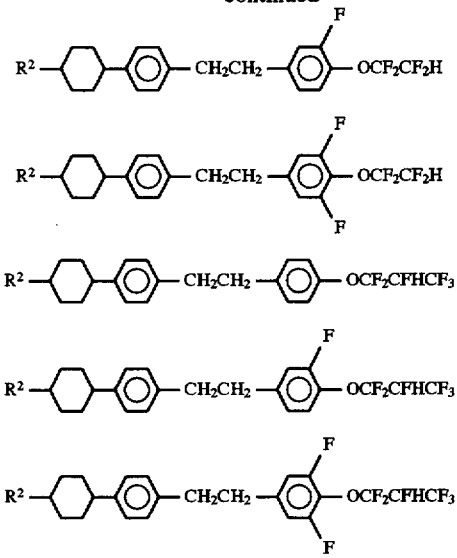

(7-13)
(7-14)
(7-15)
(7-16)
(7-17)

In those preceding formulas, $R^2$ represents an alkyl group of 1 to 10 carbon atoms; and X represents F, $CF_3$, $OCF_3$, $OCHF_2$, $OCF_2CHF_2$, or $OCF_2CHFCF_3$.

Among those compounds of the preceding formulas as the second component of the present composition, particularly preferred are compounds expressed by each of the formulas (2-1), (3-2), (3-3), (3-20), (4-1), (4-2), (4-3), (4-7), (4-20), (4-21), (4-25), (5-3), (5-7), (6-1), (6-2), (6-3), (6-5), (6-6) and (6-7).

Compounds expressed by each of general formulas (8), (9) and (10) are used in the present composition with a chief aim of adjusting a driving voltage and/or a Δn of the resulting composition while maintaining an elevated voltage holding ratio at use temperature. As compounds of formulas (8), (9) and (10) in the present composition, those compounds expressed by each of the following formulas are preferably employed:

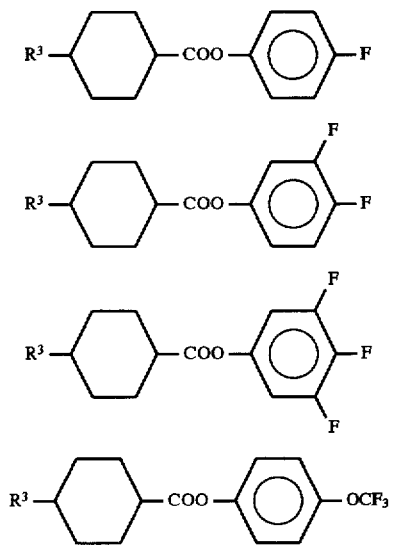

(8-1)
(8-2)
(8-3)
(8-4)

-continued

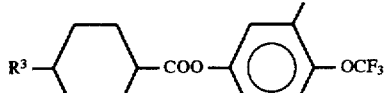
(8-5)

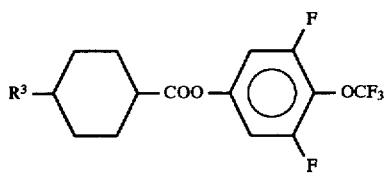
(8-6)

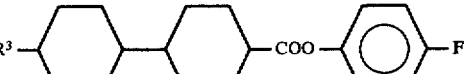
(9-1)

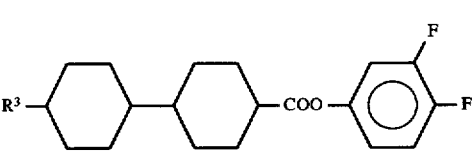
(9-2)
(9-3)

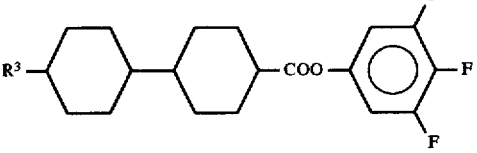
(9-4)

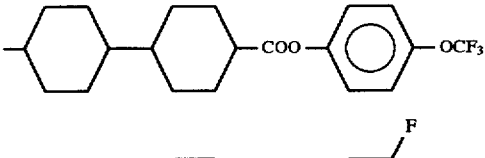
(9-5)

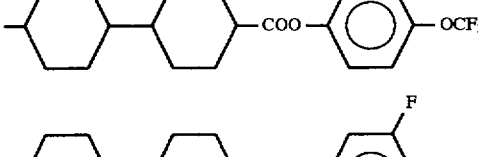
(9-6)

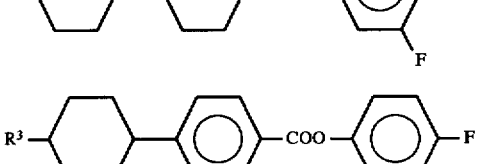
(10-1)

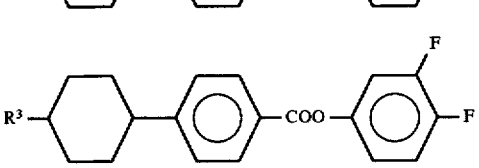
(10-2)

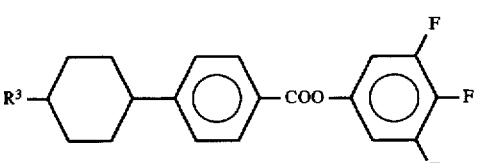
(10-3)

-continued

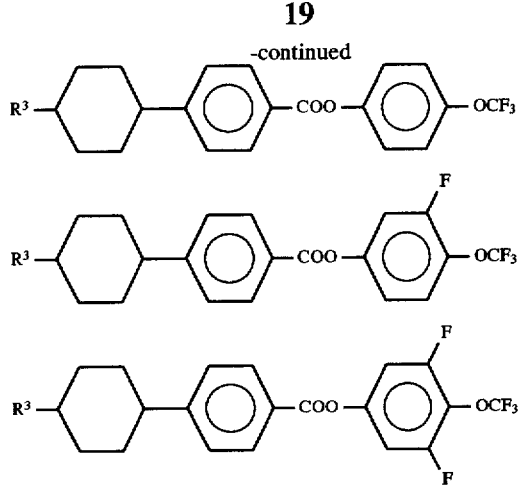

(10-4)
(10-5)
(10-6)

wherein $R^3$ represents an alkyl group of 1 to 10 carbon atoms.

Among compounds of the preceding formulas, particularly preferred in the present invention are those of formulas (8-1), (8-4), (9-1), (9-3), (9-4), (10-1) and (10-3).

A compound expressed by a general formula (11) is superior in thermal and chemical stability, and is used in the present composition with a chief aim of adjusting a clearing point and nematic range of the resulting composition. As compounds of formula (11), preferably used in the present composition are those expressed by each of the following formulas:

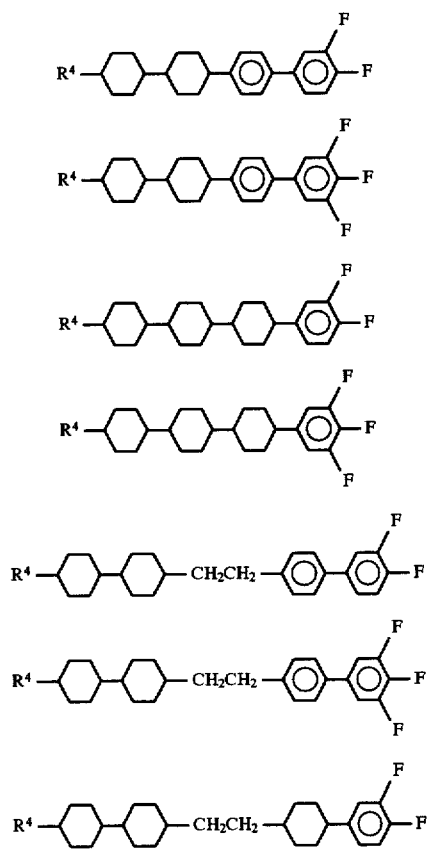

(11-1)
(11-2)
(11-3)
(11-4)
(11-5)
(11-6)
(11-7)

-continued

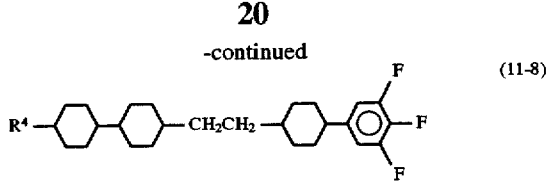

(11-8)

wherein $R^4$ represents an alkyl group of 1 to 10 carbon atoms.

Among compounds of the preceding formulas (11-1) through (11-8), compounds of formulas (11-2), (11-4), (11-6) and (11-8) are particularly preferred in the present invention.

A compound expressed by general formula (12) is used with an aim of adjusting a viscosity of the resulting composition while maintaining a voltage holding ratio at use temperature.

As compounds of formula (12), preferably used are compounds expressed by each of following formulas:

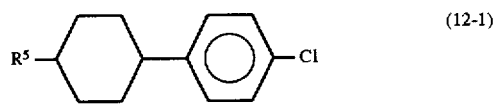

(12-1)

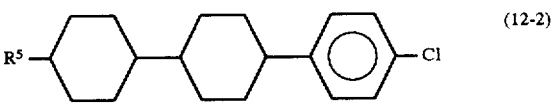

(12-2)

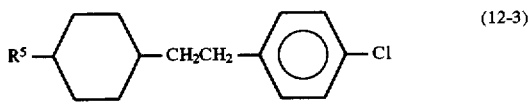

(12-3)

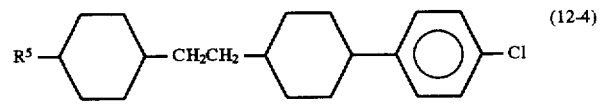

(12-4)

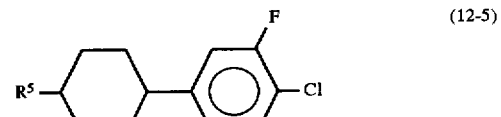

(12-5)

(12-6)

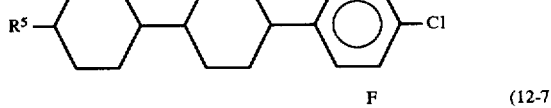

(12-7)

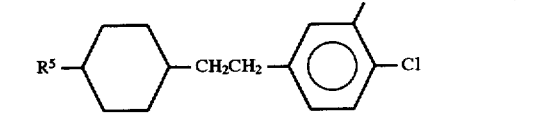

(12-8)

wherein $R^5$ represents an alkyl group of 1 to 10 carbon atoms.

Among compounds of the previous formulas, compounds of formulas (12-1), (12-2) and (12-8) are particularly preferred in the present invention.

A compound expressed by general formula (13) is a compound having two six-membered rings and a negative or weakly positive dielectric anisotropy. It is used in the present invention with a chief aim of reducing a viscosity of the resulting composition and/or adjusting a Δn thereof.

A compound expressed by general formula (14) or formula (15) has three six-membered rings and its dielectric anisotropy is negative or weakly positive. This compound is used in the present composition with a chief aim of broadening a nematic range by elevating a clearing point of the resulting composition and/or adjusting a ΔAn thereof.

As compounds expressed by any of formulas (13)-(15), compounds expressed by each of the following formulas are preferably employed in the present invention:

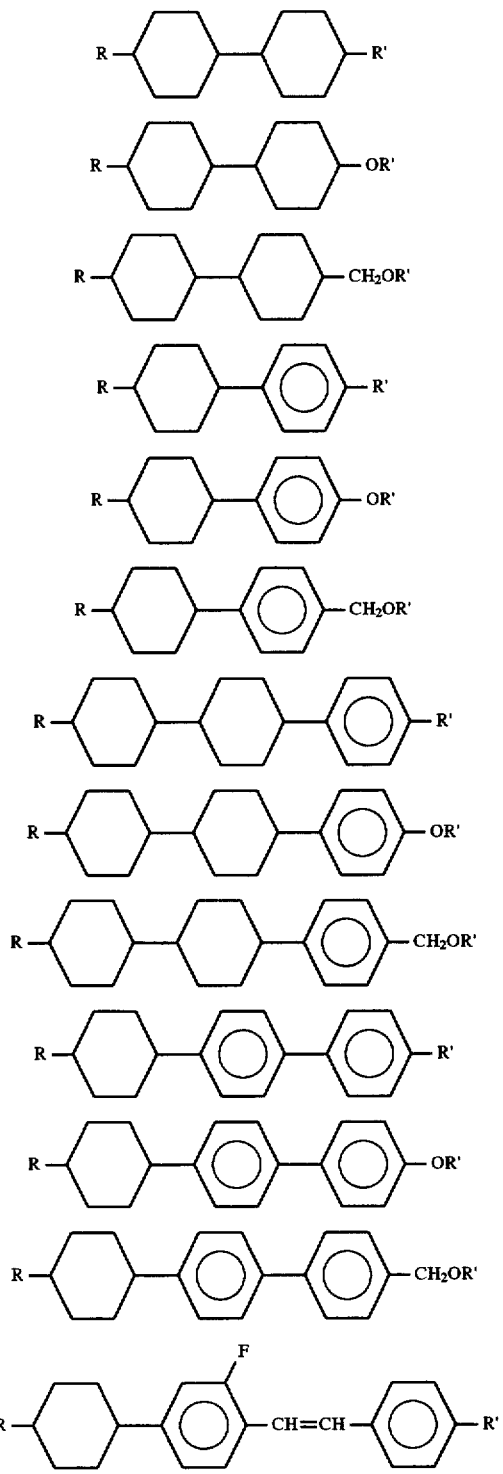

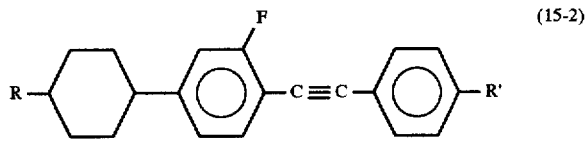

wherein R and R' represent an alkyl group of 1 to 10 carbon atoms. Among these compounds, particularly preferred in the present invention are those expressed by each of formulas (13-1), (13-3), (13-5), (14-1), (14-2), (15-1) and (15-2).

A preferable mixing proportion of the first component in the present invention is 3–50% based upon the total weight of the composition. A more preferable mixing proportion of the first component is 5–40% by weight. When the mixing proportion of the first component is less than 3% by weight, the chief aim of the present invention to reduce a threshold voltage of the composition is often unrealized. When the mixing proportion of the first component exceeds 50% by weight, a viscosity of the resulting composition may often increase.

A preferable mixing proportion of the second component is 30–97% based upon the total weight of the resulting composition. A more preferable mixing proportion of the second component is 40–97% by weight. When the mixing proportion of the second component is less than 30% by weight, it is possible that a nematic range of the resulting composition is often reduced. When the mixing proportion of the second component exceeds 97% by weight, effect of lowering the threshold voltage is very often unrealized.

In case where compounds of formulas (8)–(10) are used in addition to the first and second components in the present invention, a mixing proportion of these compounds of formulas (8)–(10) is up to 40% by weight, preferably up to 30% by weight, each based upon the total weight of the resulting composition.

In case where a compound of formula (11) is employed in addition to the first and second components in the present invention, a mixing proportion of the compound of formula (11) is up to 20% by weight, preferably up to 15% by weight based upon the total weight of the resulting composition.

In case where a compound of formula (12) is used in addition to the first and second components in the present invention, a mixing proportion of the compound of formula (12) is up to 40% by weight, preferably up to 30% by weight based upon the total weight of the resulting composition.

In case where compounds of formulas (13)–(15) are used in addition to the first and second components in the present invention, a mixing proportion of the compounds of formulas (13)–(15) is up to 40% by weight, preferably up to 30% by weight based upon the total weight of the resulting composition.

The present composition may be prepared by a method which is per se conventional. Normally, the present composition is prepared by mixing various component compounds together followed by heating them to produce a uniform mixture.

Further, the present composition may be modified by addition of a suitable compound to be improved to fulfill an intended purpose of use. Such an additive compound is known by a person skilled in the art to be disclosed precisely in literatures or the like. To the present composition is generally added a chiral dopant which induces a helical structure in the molecules to adjust a twist angle thereof in order to prevent a reverse twist of the LC molecules in display cells.

Furthermore, the composition of the present invention may be used in a guest and host mode display device by addition of dichroic dyestuffs such as merocyanines, styryl derivatives, azo compounds, azomethines, azoxy compounds, quinophthalones, anthraquinones, tetrazine derivatives, etc.

It is also possible to use the liquid crystal composition of the present invention for NCAP prepared by micro-encapsulating nematic liquid crystals, or for polymer-dispersion type display device (PDLCD) including as a typical example of polymer net-work liquid crystal display device (PNLCD) having three-dimensional, reticulated polymers formed in liquid crystals. Besides, it is possible to use the present liquid crystal composition as a LC material for electrically controlled birefringence (ECB) mode display and a dynamic scattering (DS) mode display.

More preferable embodiments of the present invention are shown in the following items (a) through (k).

(a) A liquid crystal composition comprising the first and second components, the first component consisting of at least one compound selected from the group of compounds expressed by the above-mentioned formula (1-3), (1-4) or (1-9), the second component consisting of at least one compound selected from the group of compounds expressed by the above-mentioned formula (2-1), (3-2), (3-3), (3-20), (4-1), (4-2), (4-3), 4-7), (4-20), (4-21), (4-25), (5-3), (5-7), (6-1), (6-2), (6-3), (6-5), (6-6) or (6-7), mixing proportions of the first and second components being 5–40% and 40–97%, respectively, based upon the total weight of the composition.

(b) A liquid crystal composition according to item (a), further comprising the third component consisting of at least one compound selected from the group of compounds expressed by the above-mentioned formula (8-1), (8-4), (9-1), (9-3), (9-4), (10-1) or (10-3), a mixing proportion of the third component being at most 30% based upon the total weight of the composition.

(c) A liquid crystal composition according to item (a), further comprising the third component consisting of at least one compound selected from the group of compounds expressed by the above-mentioned formula (11-2), (11-4) or (11-6), a mixing proportion of the third component being at most 15% based upon the total weight of the composition.

(d) A liquid crystal composition according to item (a), further comprising the third component consisting of at least one compound selected from the group of compounds expressed by the above-mentioned formula (12-1), (12-2) or (12-8), a mixing proportion of the third component being at most 30% based upon the total weight of the composition.

(e) A liquid crystal composition according to item (a), further comprising the third component consisting of at least one compound selected from the group of compounds expressed by the above-mentioned formula (13-1), (13-3), (13-5), (14-1) (14-2), (15-1) or (15-2), a mixing proportion of the third component being at most 30% based upon the total weight of the composition.

(f) A liquid crystal composition according to item (b), further comprising the fourth component consisting of at least one compound selected from the group of compounds expressed by the above-mentioned formula (11-2), (11-4) or (11-6), a mixing proportion of the fourth component being at most 15% based upon the total weight of the composition.

(g) A liquid crystal composition according to item (b), further comprising the fourth component consisting of at least one compound selected from the group of compounds expressed by the above-mentioned formula (12-1), (12-2) or (12-8), a mixing proportion of the fourth component being at most 30% based upon the total weight of the composition.

(h) A liquid crystal composition according to item (f), further comprising the fifth component consisting of at least one compound selected from the group of compounds expressed by the above-mentioned formula (12-1), (12-2) or (12-8), a mixing proportion of the fifth component being at most 30% based upon the total weight of the composition.

(i) A liquid crystal composition according to item (b), further comprising the fourth component consisting of at least one compound selected from the group of compounds expressed by the above-mentioned formula (13-1), (13-3), (13-5), (14-1), (14-2), (15-1) or (15-2), a mixing proportions of the fourth component being at most 30% based upon the total weight of the composition.

(j) A liquid crystal composition according to item (i), further comprising the fifth component consisting of at least one compound selected from the group of compounds expressed by the above-mentioned formula (12-1), (12-2) or (12-8), a mixing proportion of the fifth component being at most 30% based upon the total weight of the composition.

(k) A liquid crystal composition according to item (j), further comprising the sixth component consisting of at least one compound selected from the group of compounds expressed by the above-mentioned formula (11-2), (11-4) or (11-6), a mixing proportion of the sixth component being at most 15% based upon the total weight of the composition.

EXAMPLES

The present invention will be described by examples and comparative examples below, but the invention is not construed to be limited to the examples. In these examples, the compositions are expressed in percent by weight. A voltage holding ratio was determined by an area method.

Comparative example

A liquid crystal composition consisting of

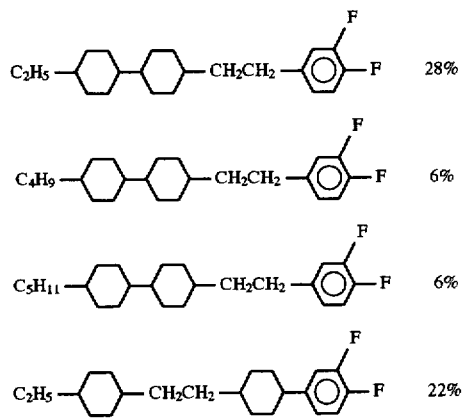

-continued

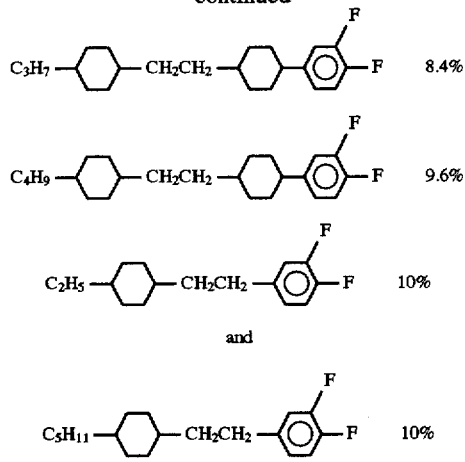

was prepared.

A clearing point ($T_{NI}$) of this composition was 78.9° C. A viscosity ($\eta$) at 20° C. was 26.2 mPa.s, an optical isotropy ($\Delta n$) at 25° C. was 0.080, a dielectric anisotropy ($\Delta\epsilon$) at 20° C. was 6.7, a threshold voltage ($V_{th}$) at 20° C. was 1.97 V, and a voltage holding ratio at 25° C. was 98.1%.

Example 1

A liquid crystal composition consisting of

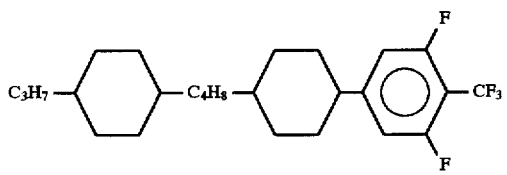 20%

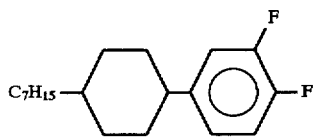 5%

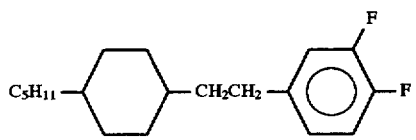 10%

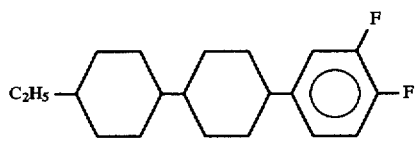 11.7%

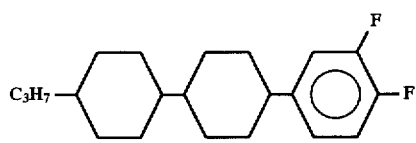 11.7%

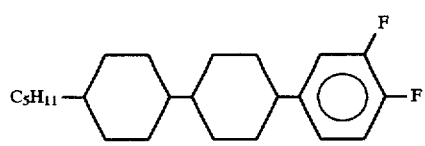 11.6%

-continued

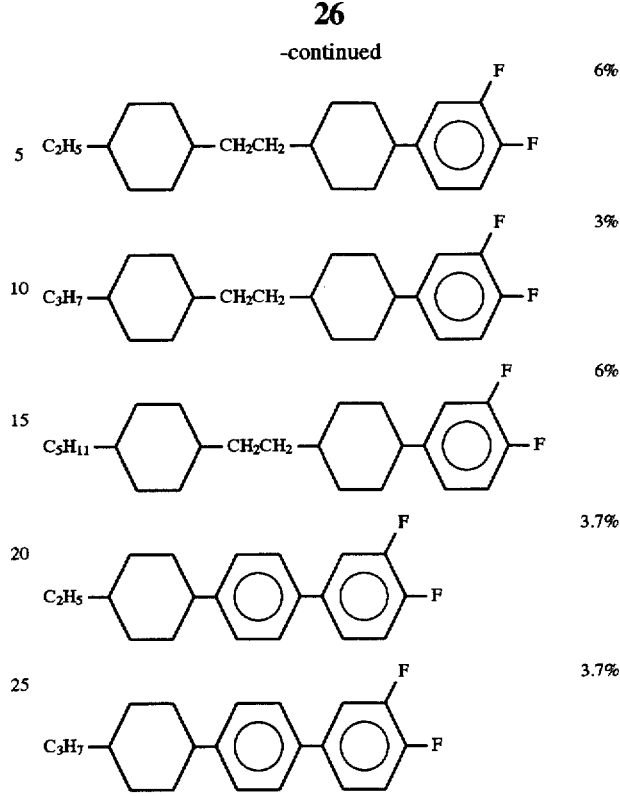

was prepared. A clearing point of this composition was 64.6° C. A viscosity at 20° C., an optical anisotropy at 25° C., a dielectric anisotropy at 20° C., and a threshold voltage at 20° C., of the composition were 24.1 mPa.s, 0.079, 5.8, and 1.81V., respectively, and a voltage holding ratio at 25° C. was 98.3%. Comparing these properties with those of the comparative example, a threshold voltage was reduced while a voltage holding ratio being maintained.

Example 2

A liquid crystal composition consisting of

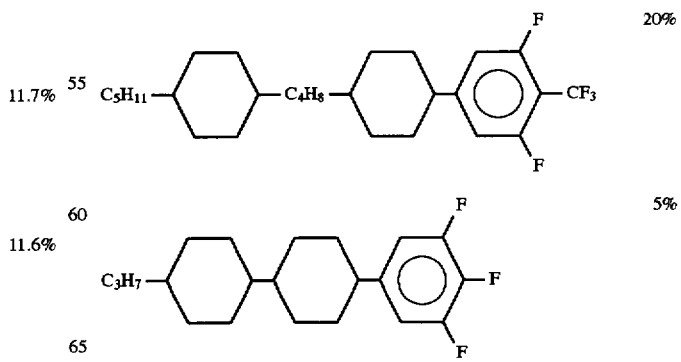

-continued
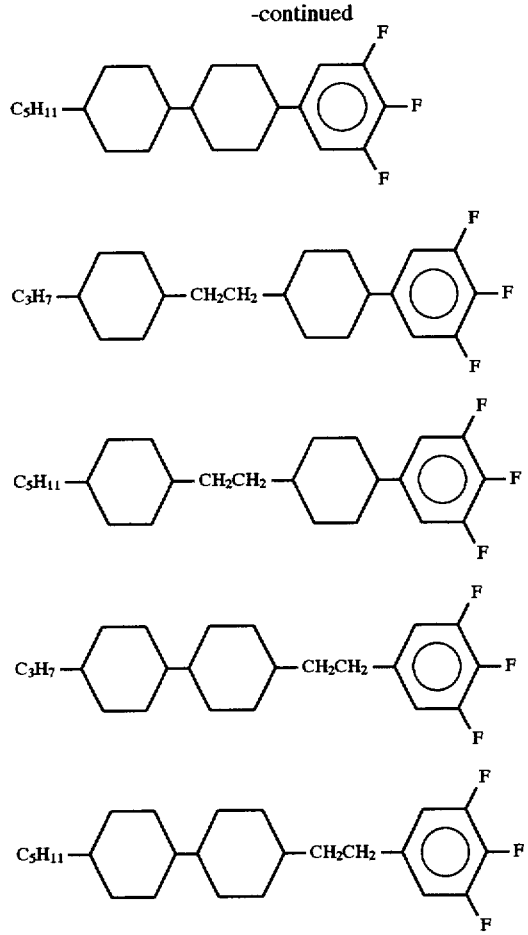
15%
10%
15%
10%
15%
10%
and
was prepared. A clearing point of this composition was 83.0° C. A viscosity at 20° C., an optical anisotropy at 25° C., a dielectric anisotropy at 20° C., and a threshold voltage at 20° C., of the composition were 31.4 mPa.s, 0.080, 8.6, and 1.87 V., respectively, and a voltage holding ratio at 25° C. was 98.2%.
Example 3
A liquid crystal composition consisting of
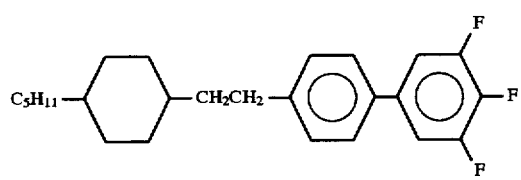
10%
-continued
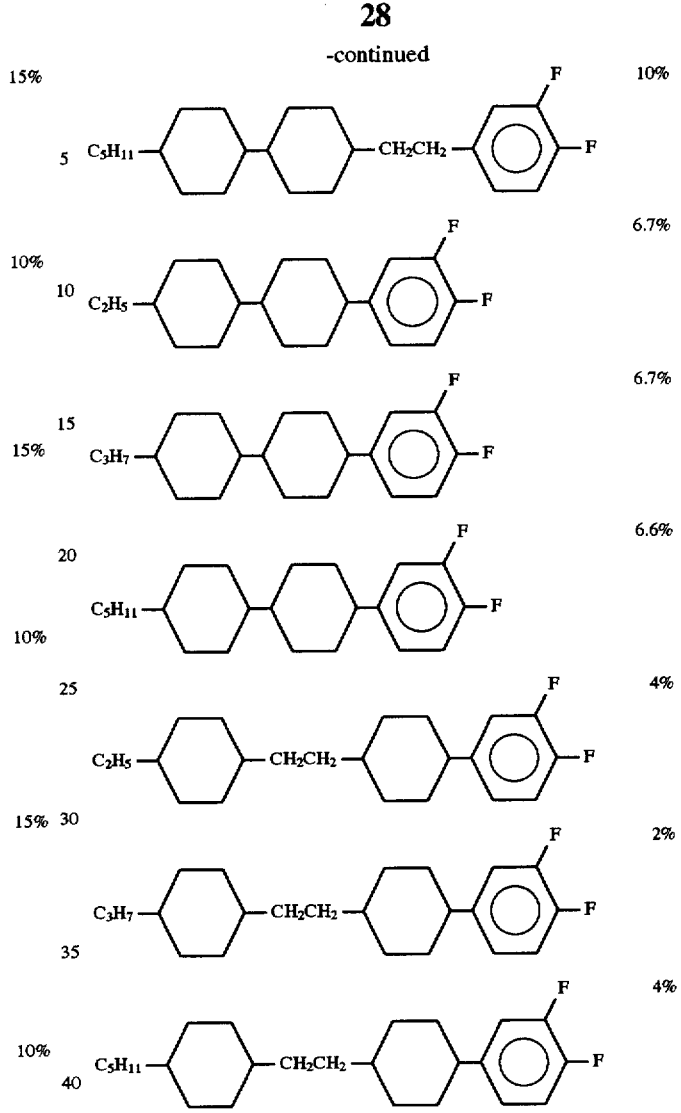
10%
6.7%
6.7%
6.6%
4%
2%
4%
2.5%
2.5%
5%
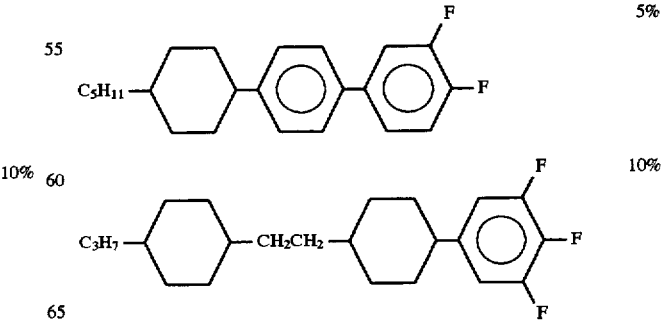
10%

-continued
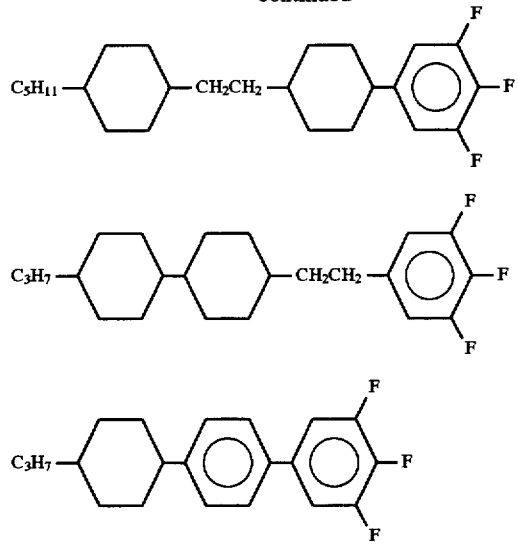
5%
10%
5%
and
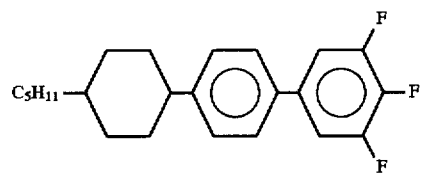
5%
was prepared. A clearing point of this composition was 67.0° C. A viscosity at 20° C., an optical anisotropy at 25° C., a dielectric anisotropy at 20° C., and a threshold voltage at 20° C., of the composition were 25.0 mPa.s, 0.085, 6.7, and 1.71 V., respectively, and a voltage holding ratio at 25° C. was 98.3%.
Example 4
A liquid crystal composition consisting of
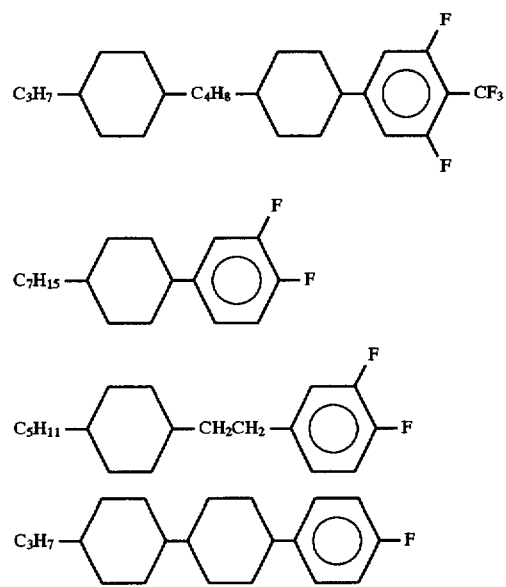
10%
5%
5%
5%
-continued
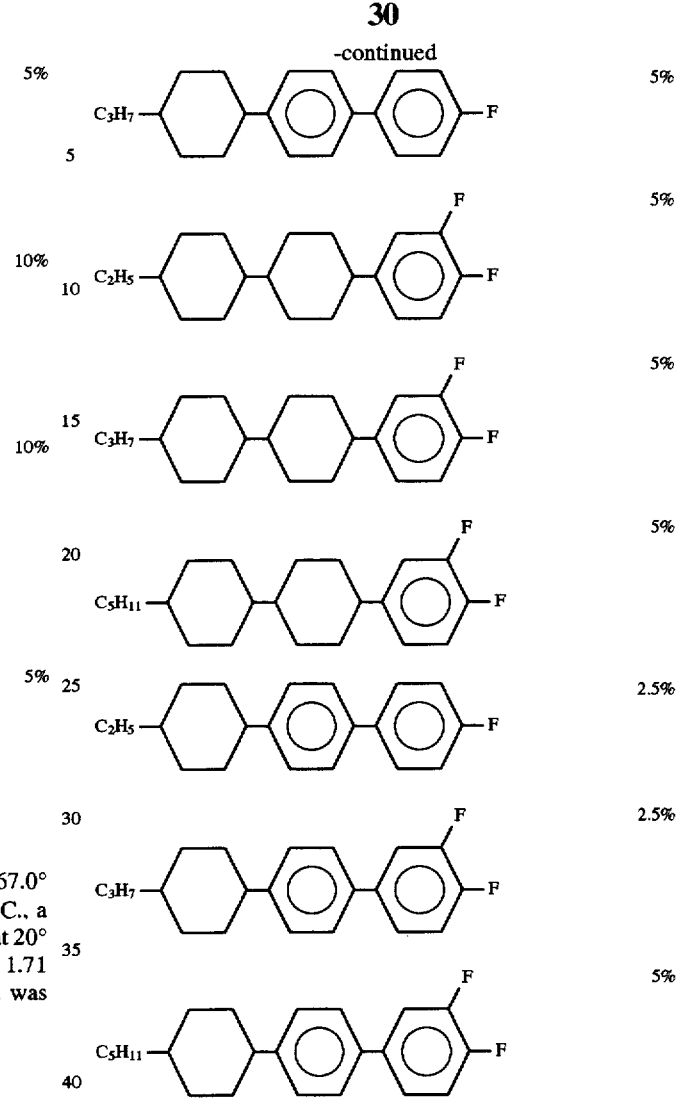
5%
5%
5%
5%
2.5%
2.5%
5%
15%
10%
10%
and

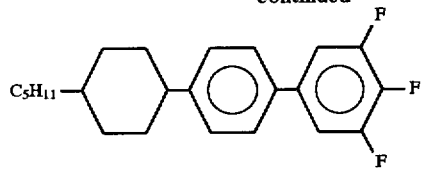 10% was prepared. A clearing point of this composition was 71.4° C. A viscosity at 20° C., an optical anisotropy at 25° C., a dielectric anisotropy 20° C., and a threshold voltage at 20° C., of the composition were 23.7 mPa.s, 0.093, 6.9, and 1.76 V., respectively, and a voltage holding ratio was 98.3% at 25° C.

Example 5

A liquid crystal composition consisting of

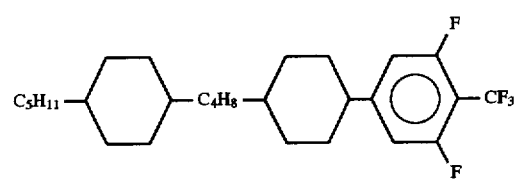 10%

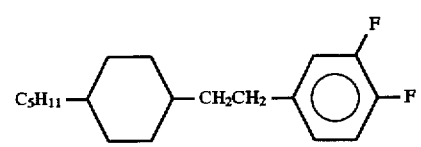 5%

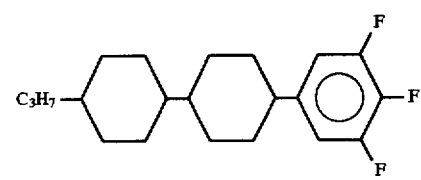 5%

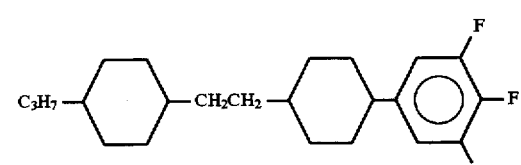 10%

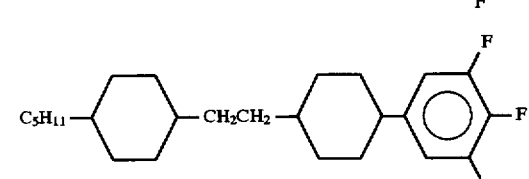 10%

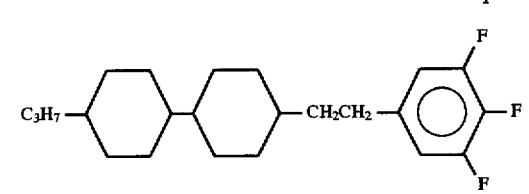 12%

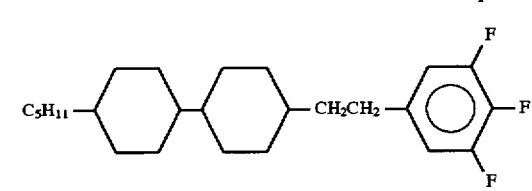 12%

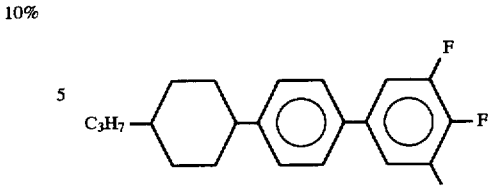 5%

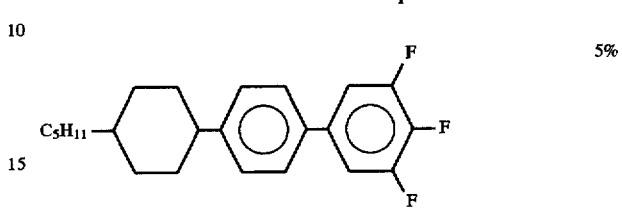 5%

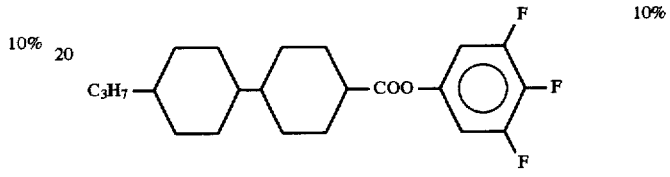 10%

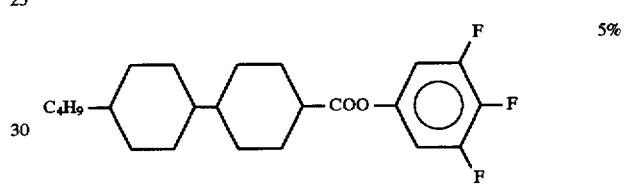 5%

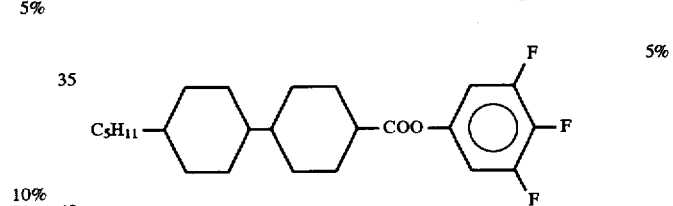 5%

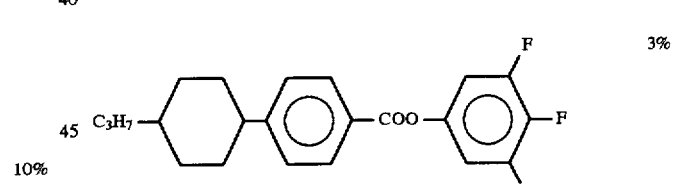 3% and

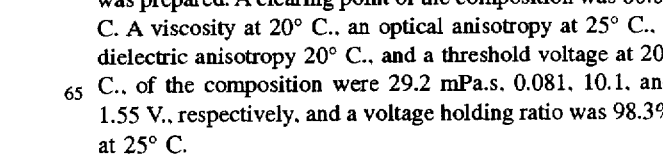 3% was prepared. A clearing point of the composition was 80.0° C. A viscosity at 20° C., an optical anisotropy at 25° C., a dielectric anisotropy 20° C., and a threshold voltage at 20° C., of the composition were 29.2 mPa.s, 0.081, 10.1, and 1.55 V., respectively, and a voltage holding ratio was 98.3% at 25° C.

Example 6
A liquid crystal composition consisting of
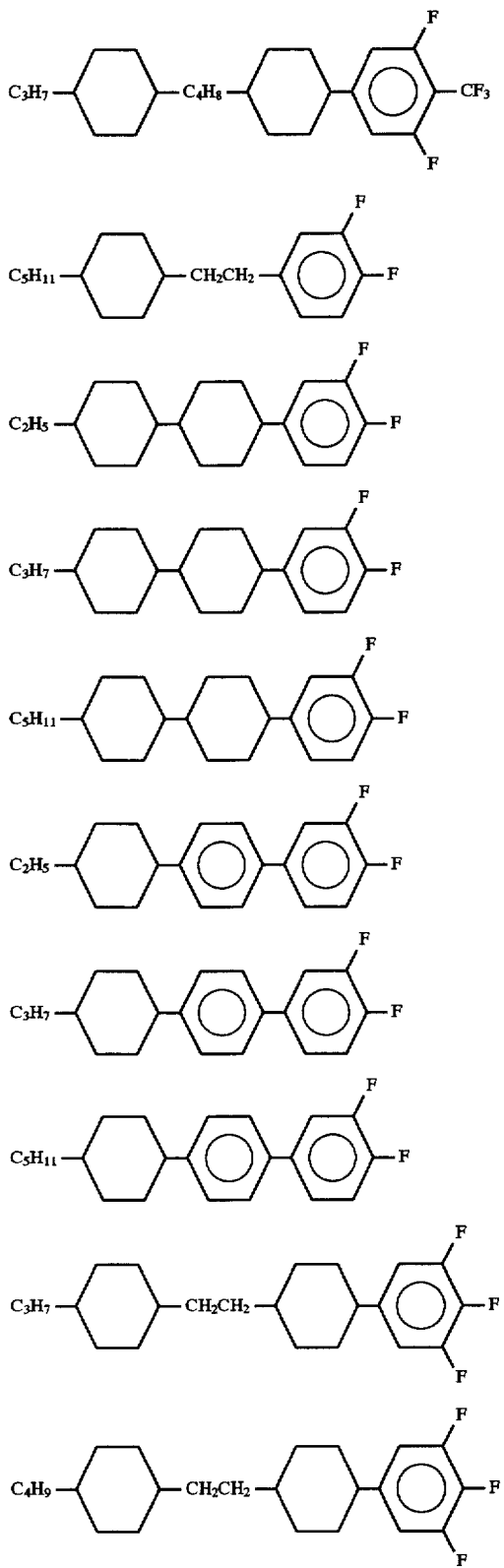
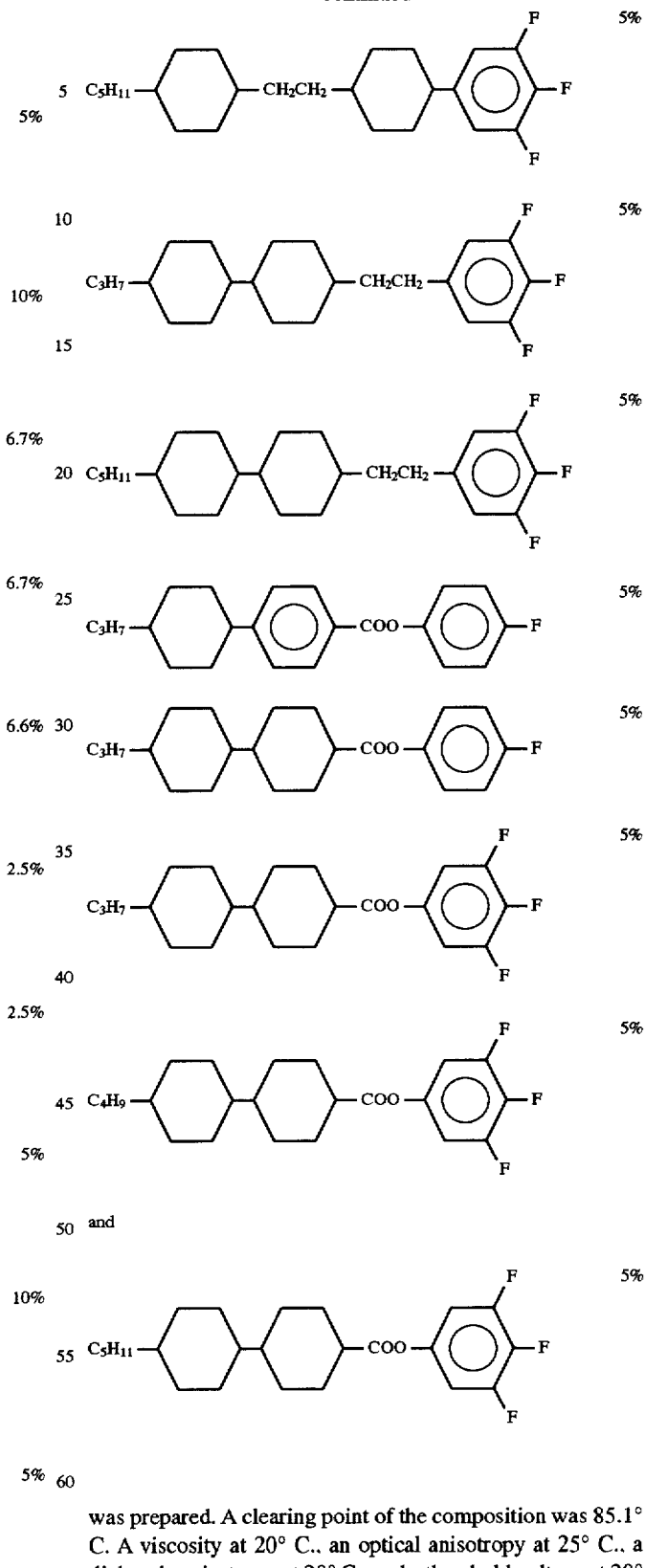
was prepared. A clearing point of the composition was 85.1° C. A viscosity at 20° C., an optical anisotropy at 25° C., a dielectric anisotropy at 20° C., and a threshold voltage at 20° C., of the composition were 24.8 mPa.s, 0.081, 7.1, and 1.78 V., respectively, and a voltage holding ratio was 98.4% at 25° C.

Example 7
A liquid crystal composition consisting of
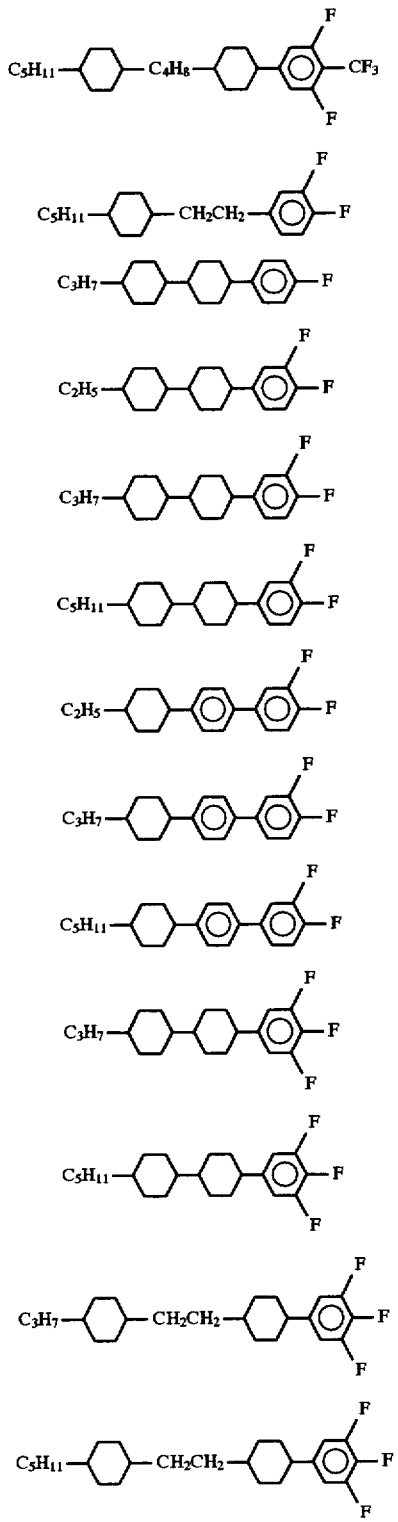
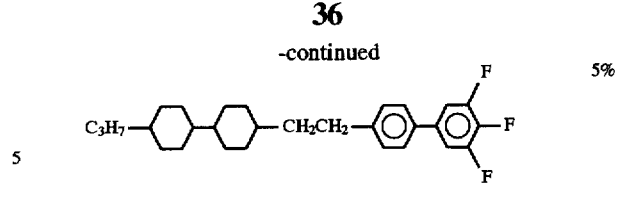
was prepared. A clearing point of the composition was 80.7° C. A viscosity at 20° C., an optical anisotropy at 25° C., a dielectric anisotropy 20° C., and a threshold voltage at 20° C., of the composition were 25.0 mPa.s, 0.084, 6.9, and 1.84 V., respectively, and a voltage holding ratio was 98.3% at 25° C.
Example 8
A liquid crystal composition consisting of
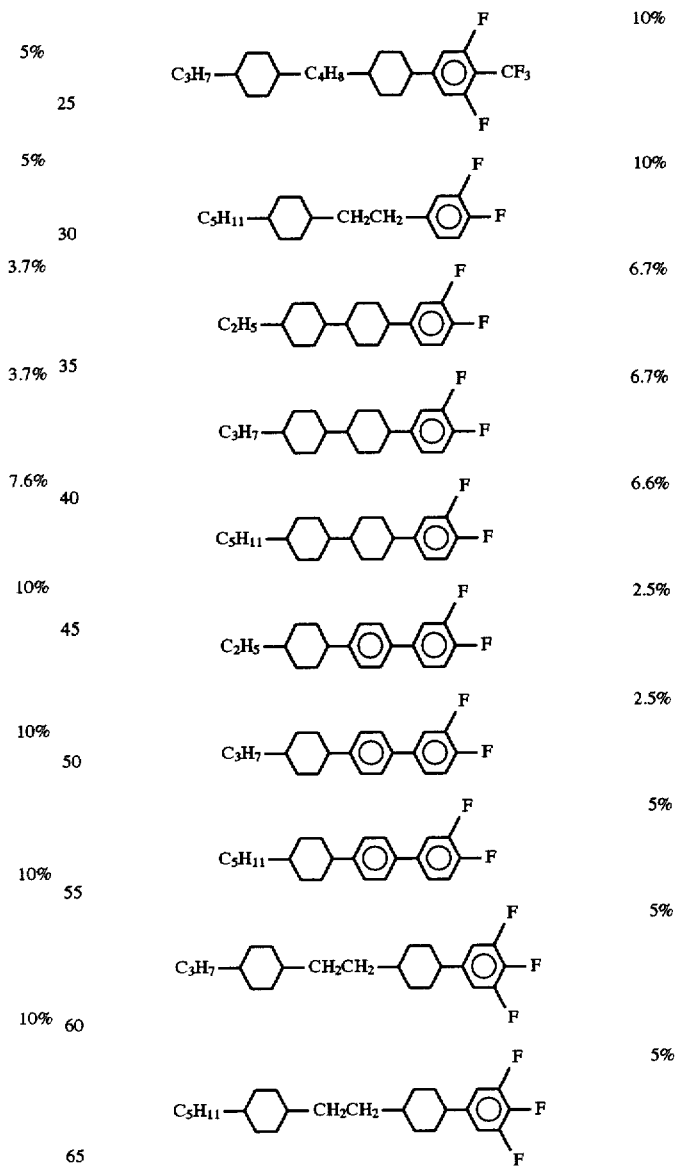

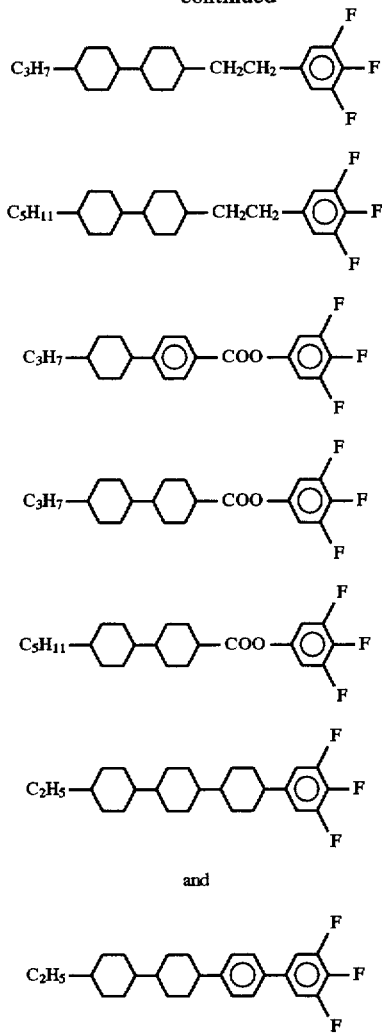

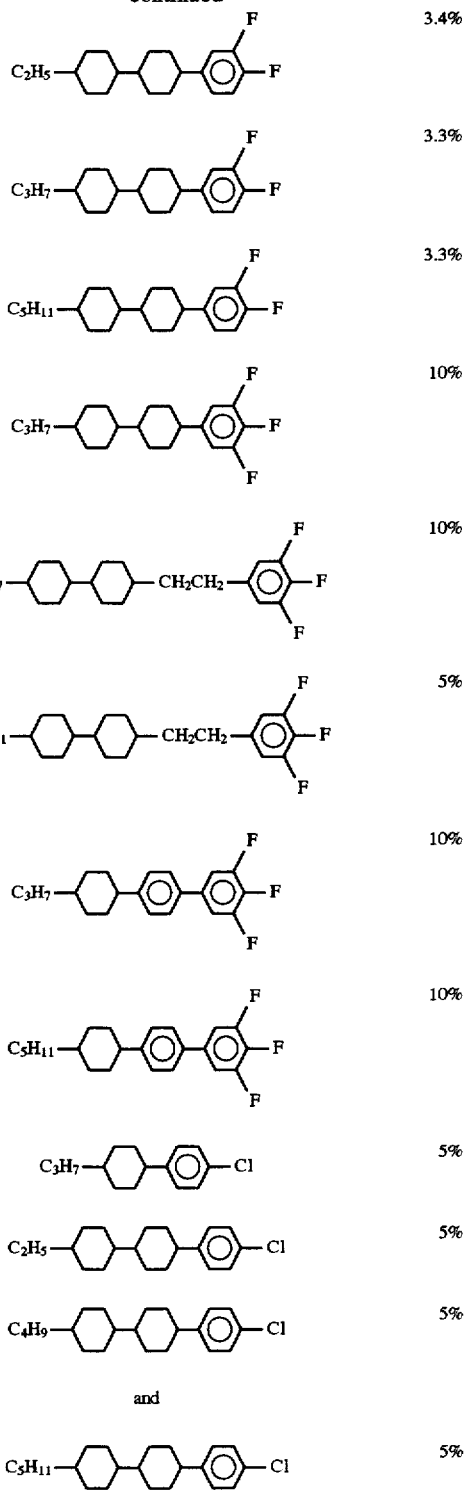

was prepared. A clearing point of the composition was 86.2° C. A viscosity at 20° C., an optical anisotropy at 25° C., a dielectric anisotropy at 20° C., and a threshold voltage at 20° C., of the composition were 28.8 mPa.s, 0.087, 9.2, and 1.64 V., respectively, and a voltage holding ratio was 98.2% at 25° C.

Example 9

A liquid crystal composition consisting of

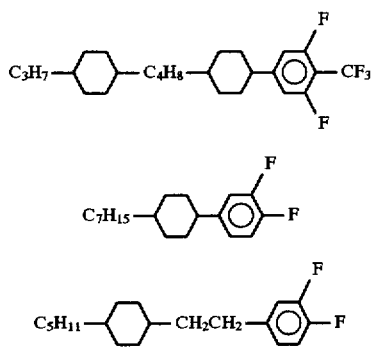

was prepared. A clearing point of this composition was 64.4° C. A viscosity at 20° C., an optical anisotropy at 25° C., a dielectric anisotropy at 20° C., and a threshold voltage at 20° C., of the composition were 21.2 mPa.s, 0.086, 6.6, and 1.72 V., respectively, and a voltage holding ratio was 98.4% at 25° C.

Example 10

A liquid crystal composition consisting of

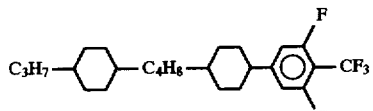 10%

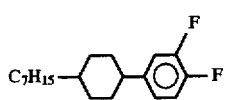 10%

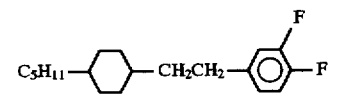 15%

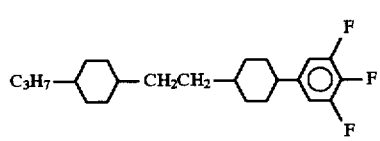 10%

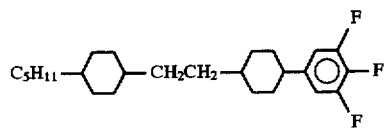 10%

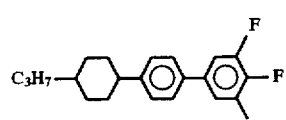 5%

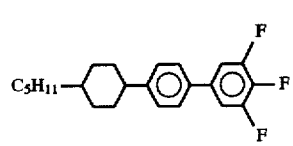 5%

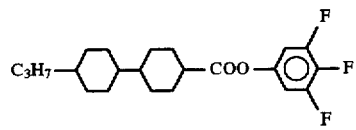 5%

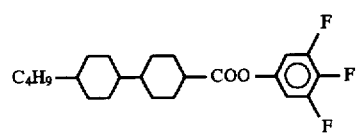 5%

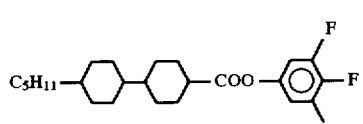 5%

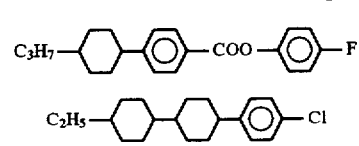 5%

 5%

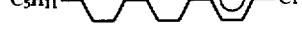 5% and

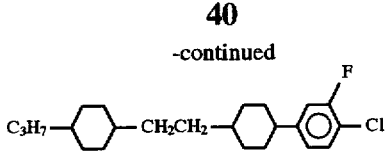 5% was prepared. A clearing point of the composition was 60.0° C. A viscosity at 20 ° C., an optical anisotropy at 25° C., a dielectric anisotropy at 20° C., and a threshold voltage at 20 ° C., of the composition were 23.5 mPa.s, 0.077, 6.7, and 1.55 V., respectively, and a voltage holding ratio was 98.3% at 25° C.

Example 11

A liquid crystal composition consisting of

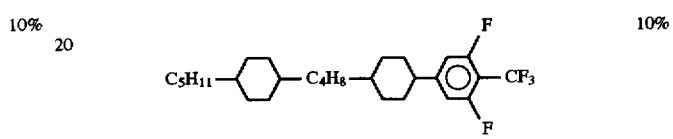 10%

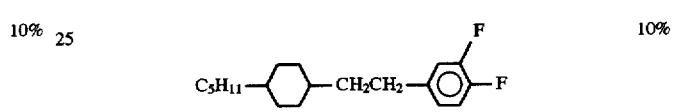 10%

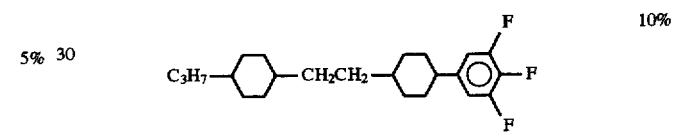 10%

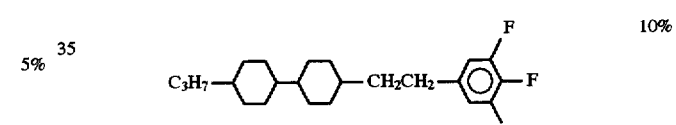 10%

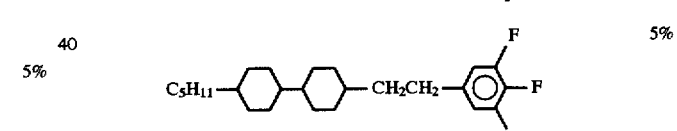 5%

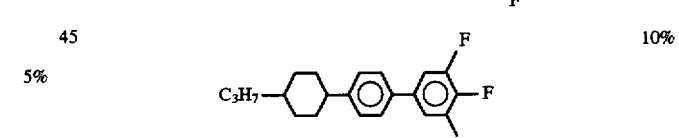 10%

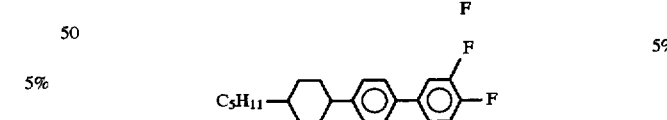 5%

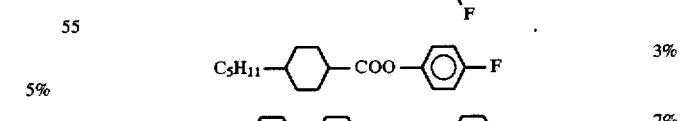 3%

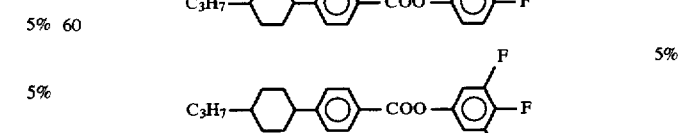 7%

 5%

-continued
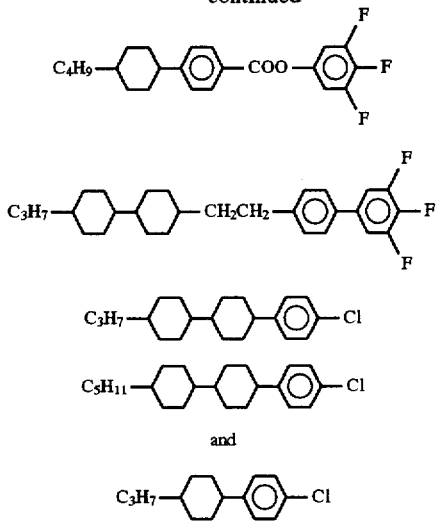
5%
5%
5%
5%
and
5%
was prepared. A clearing point of the composition was 74.6° C. A viscosity at 20° C., an optical anisotropy at 25° C., a dielectric anisotropy at 20° C., and a threshold voltage at 20° C., of the composition were 26.5 mPa.s, 0.095, 9.3, and 1.59 V., respectively, and a voltage holding ratio was 98.3% at 25° C.
Example 12
A liquid crystal composition consisting of
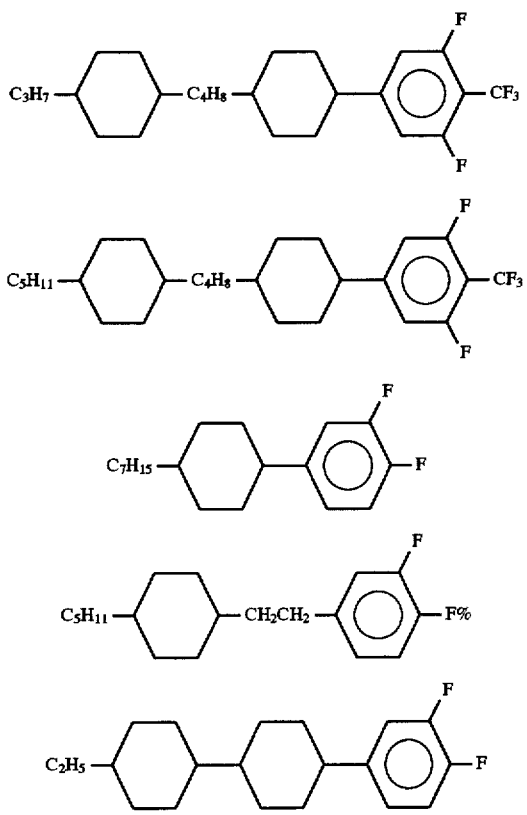
5%
10%
4%
6%
6.7%
-continued
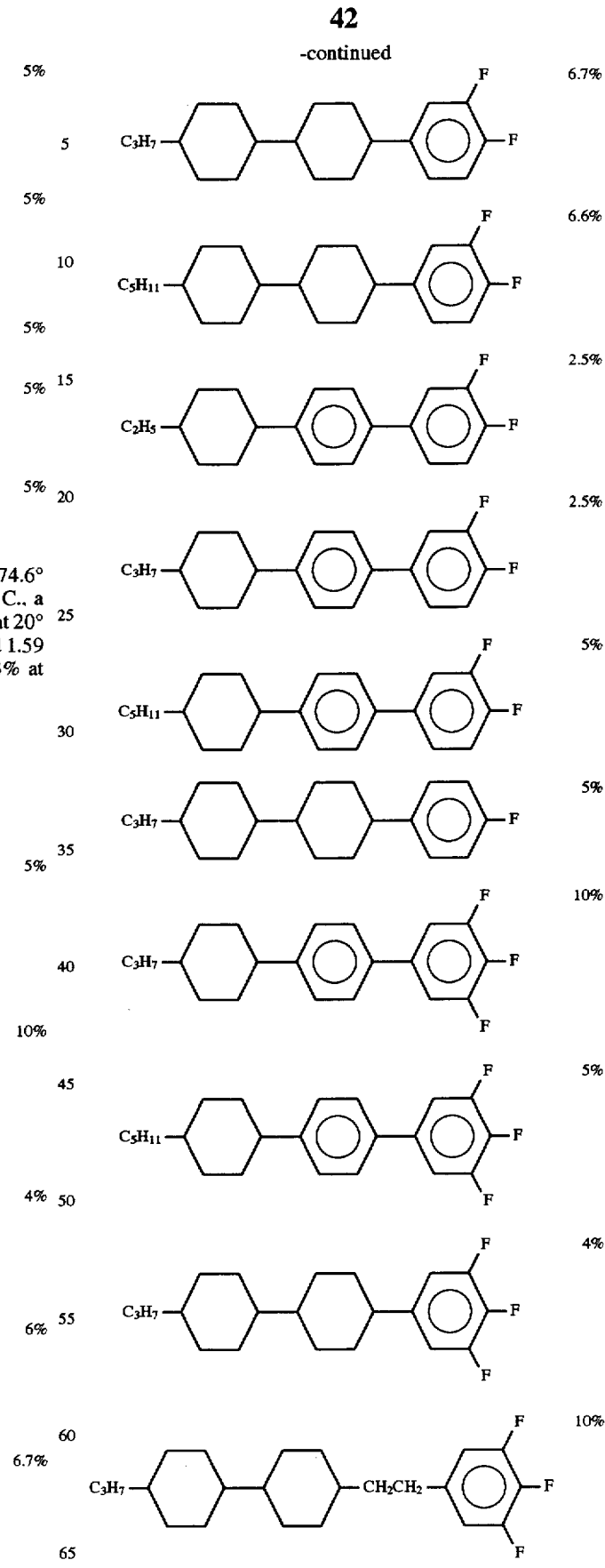
6.7%
6.6%
2.5%
2.5%
5%
5%
10%
5%
4%
10%

-continued

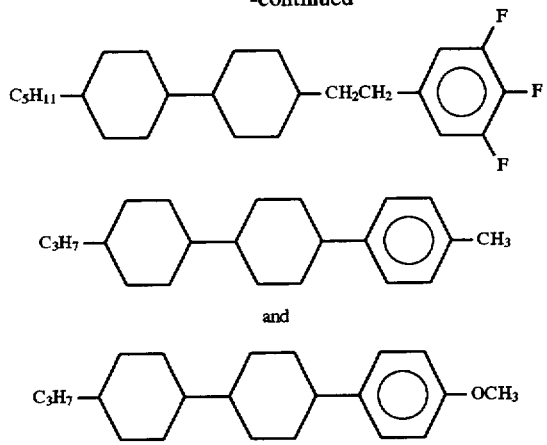

5%

3%

3% was prepared. A clearing point of the composition was 78.5° C. A viscosity at 20° C., an optical anisotropy at 25° C., a dielectric anisotropy at 20° C., and a threshold voltage at 20° C., of the composition were 24.3 mPa.s, 0.090, 6.7, and 1.87 V., respectively, and a voltage holding ratio was 98.3% at 25° C.

Example 13

A liquid crystal composition consisting of

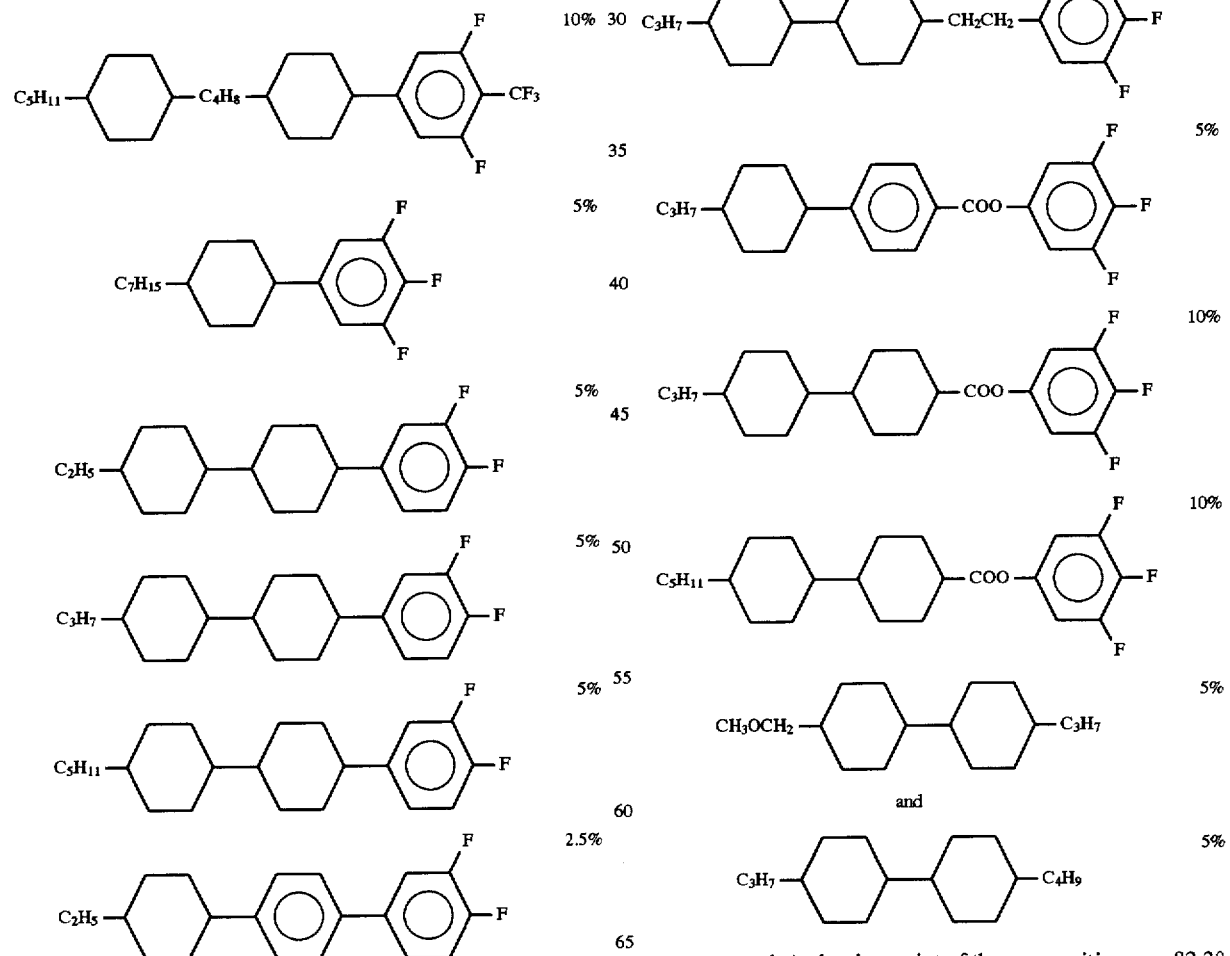

10%

5%

5%

5%

5%

2.5%

-continued

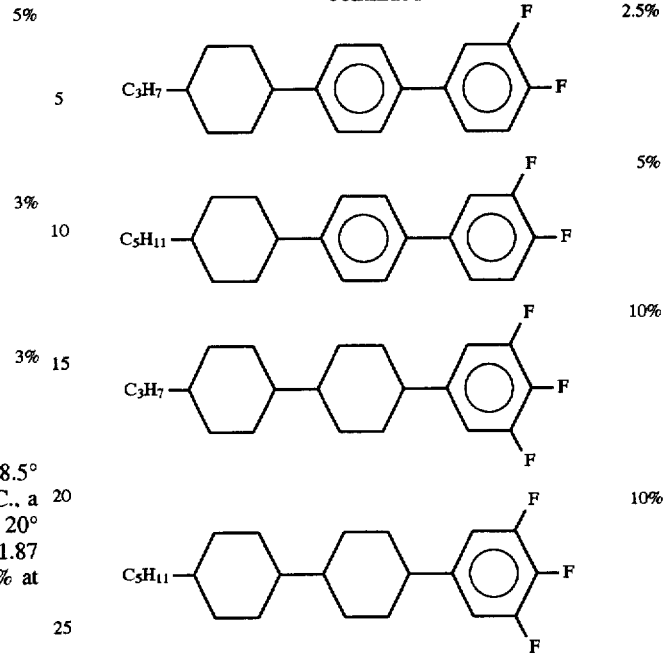

2.5%

5%

10%

10%

5%

5%

10%

10%

5% and

5% was prepared. A clearing point of the composition was 82.3° C. A viscosity at 20° C., an optical anisotropy at 25° C., a dielectric anisotropy at 20° C., and a threshold voltage at 20° C., of the composition were 23.5 mPa.s, 0.079, 8.2, and 1.67 V., respectively, and a voltage holding ratio was 98.3% at 25° C.

Example 14

A liquid crystal composition consisting of

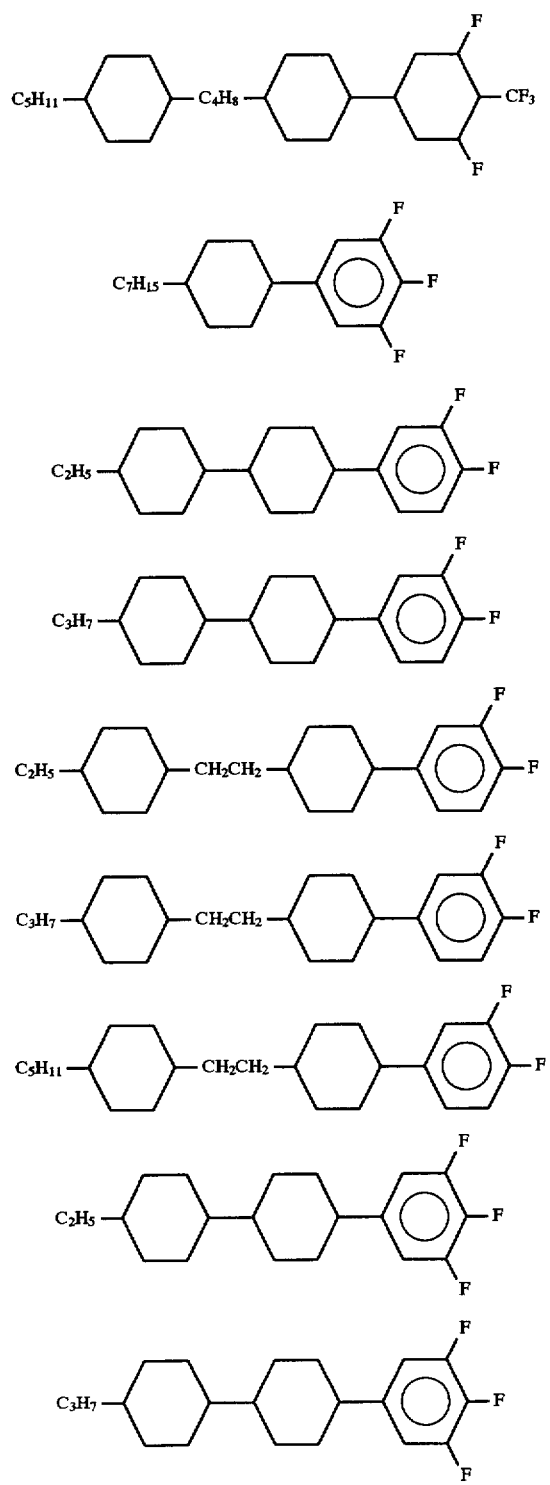

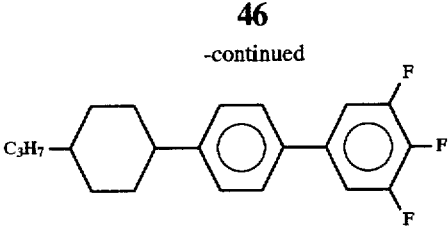 10%

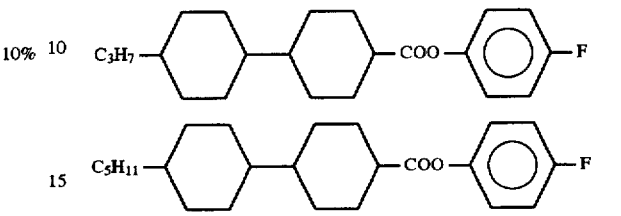 3%

3%

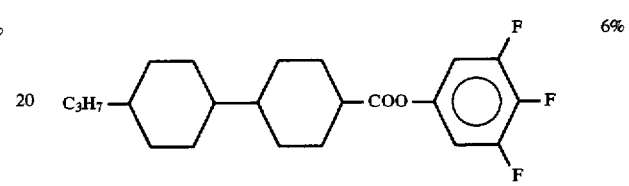 6%

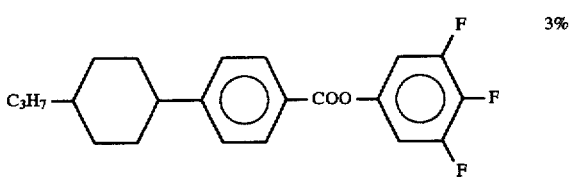 3%

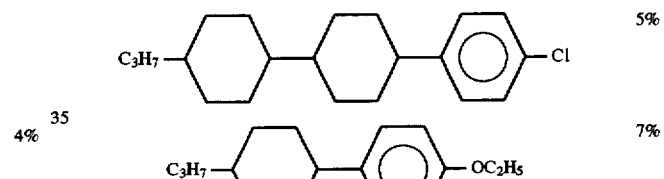 5%

7% and

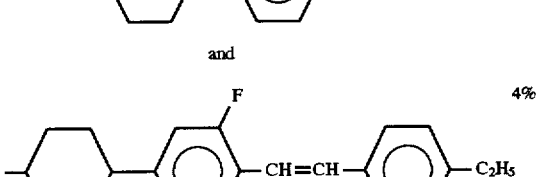 4% was prepared. A clearing point of the composition was 76.5° C. A viscosity at 20° C., an optical anisotropy at 25° C., a dielectric anisotropy at 20° C., and a threshold voltage at 20° C., of the composition were 23.1 mPa.s, 0.088, 6.8, and 1.72 V., respectively, and a voltage holding ratio was 98.3% at 25° C.

Example 15

A liquid crystal composition consisting of

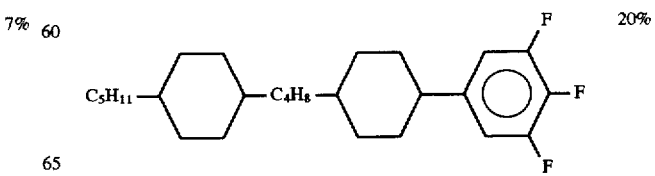 20%

-continued
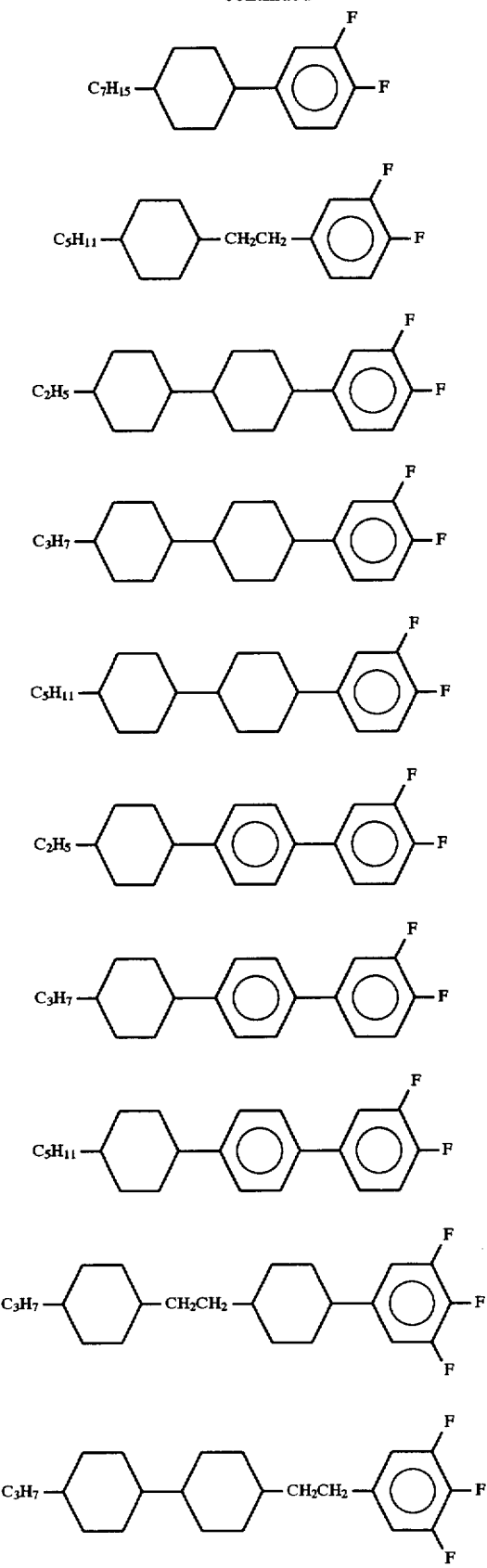
5%
10%
5%
5%
5%
2.5%
2.5%
5%
10%
10%
-continued
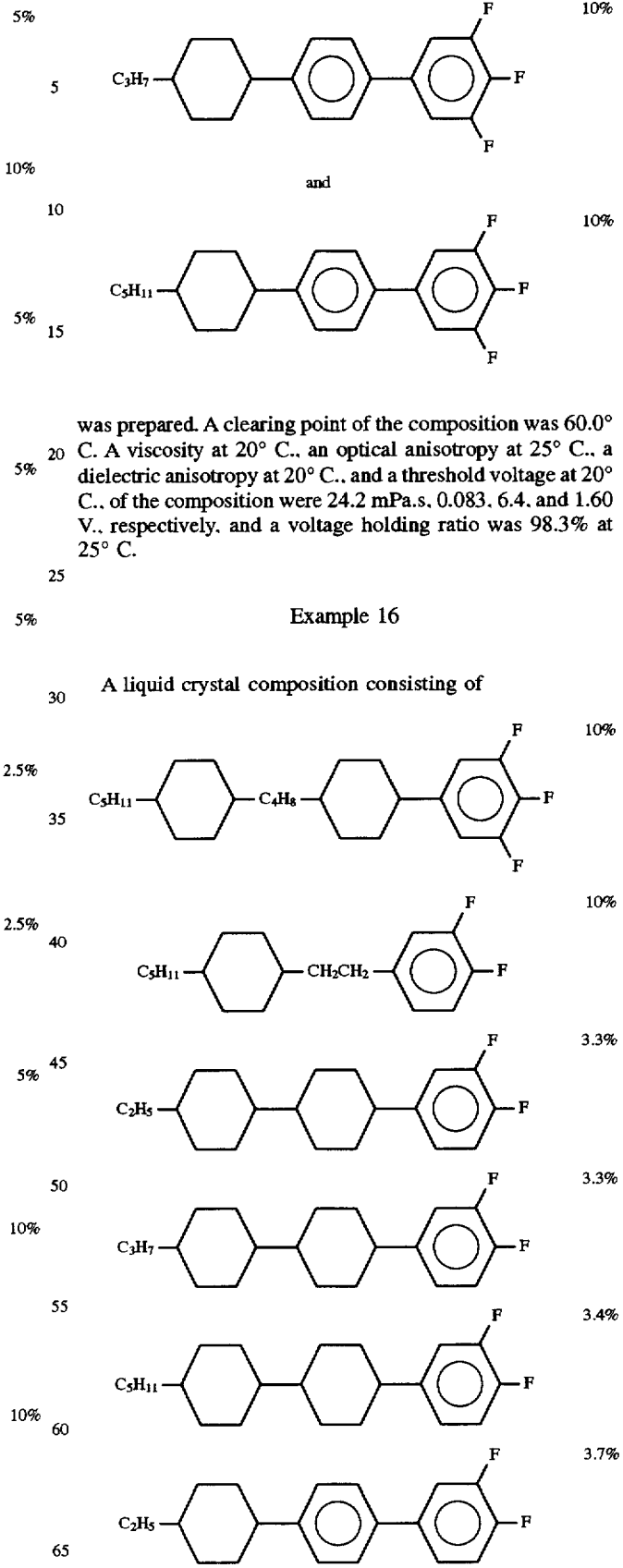
10%
and
10%
was prepared. A clearing point of the composition was 60.0° C. A viscosity at 20° C., an optical anisotropy at 25° C., a dielectric anisotropy at 20° C., and a threshold voltage at 20° C., of the composition were 24.2 mPa.s, 0.083, 6.4, and 1.60 V., respectively, and a voltage holding ratio was 98.3% at 25° C.
Example 16
A liquid crystal composition consisting of
10%
10%
3.3%
3.3%
3.4%
3.7%

-continued
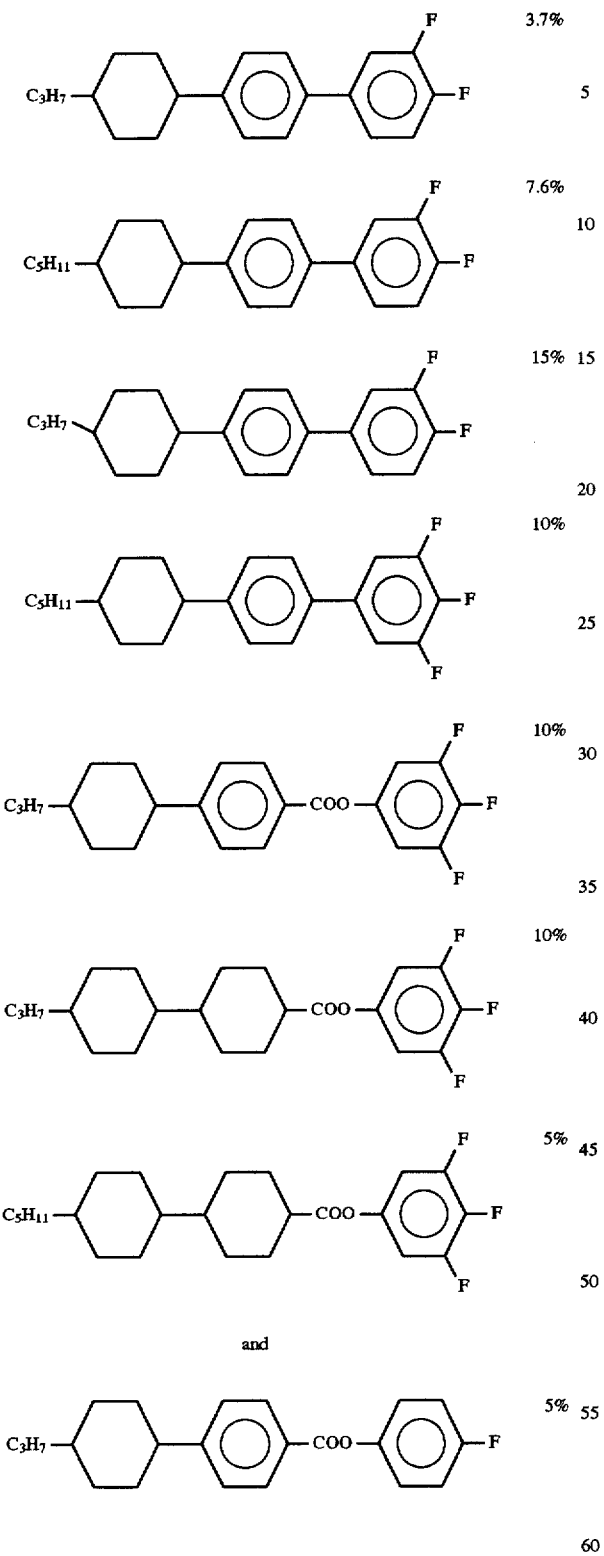
was prepared. A clearing point of the composition was 68.9° C. A viscosity at 20° C., an optical anisotropy at 25° C., a dielectric anisotropy at 20° C., and a threshold voltage at 20° C., of the composition were 30.3 mPa.s, 0.100, 9.1, and 1.42 V., respectively, and a voltage holding ratio was 98.3% at 25° C.
Example 17
A liquid crystal composition consisting of
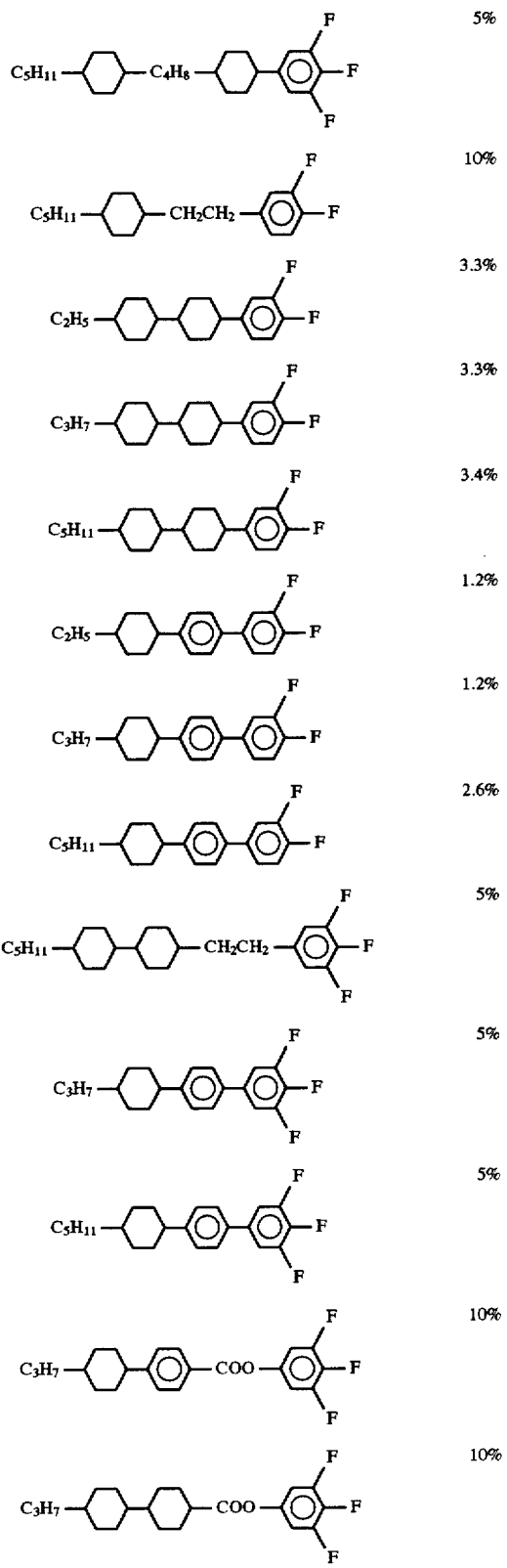

51

-continued

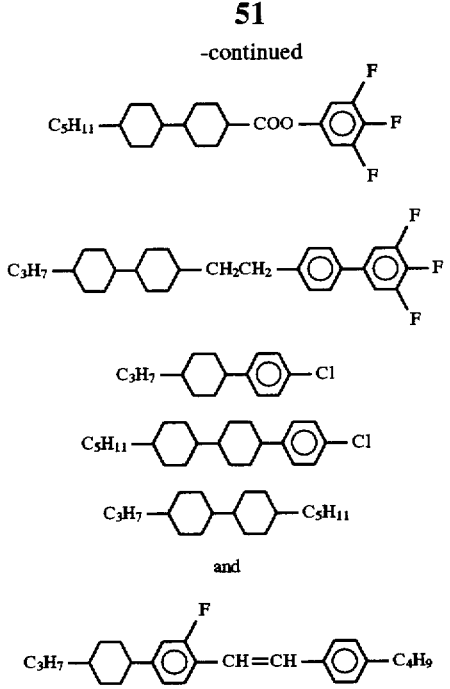

5%

10%

5%

5%

5%

5% was prepared. A clearing point of the composition was 94.4° C. A viscosity at 20° C., an optical anisotropy at 25° C., a dielectric anisotropy at 20° C., and a threshold voltage at 20° C., of the composition were 22.9 mPa.s, 0.103, 8.1, and 1.82 V., respectively, and a voltage holding ratio was 98.3% at 25° C.

Example 18

A liquid crystal composition consisting of 7.5%

7.5%

5%

5%

3.3%

3.3%

52

-continued

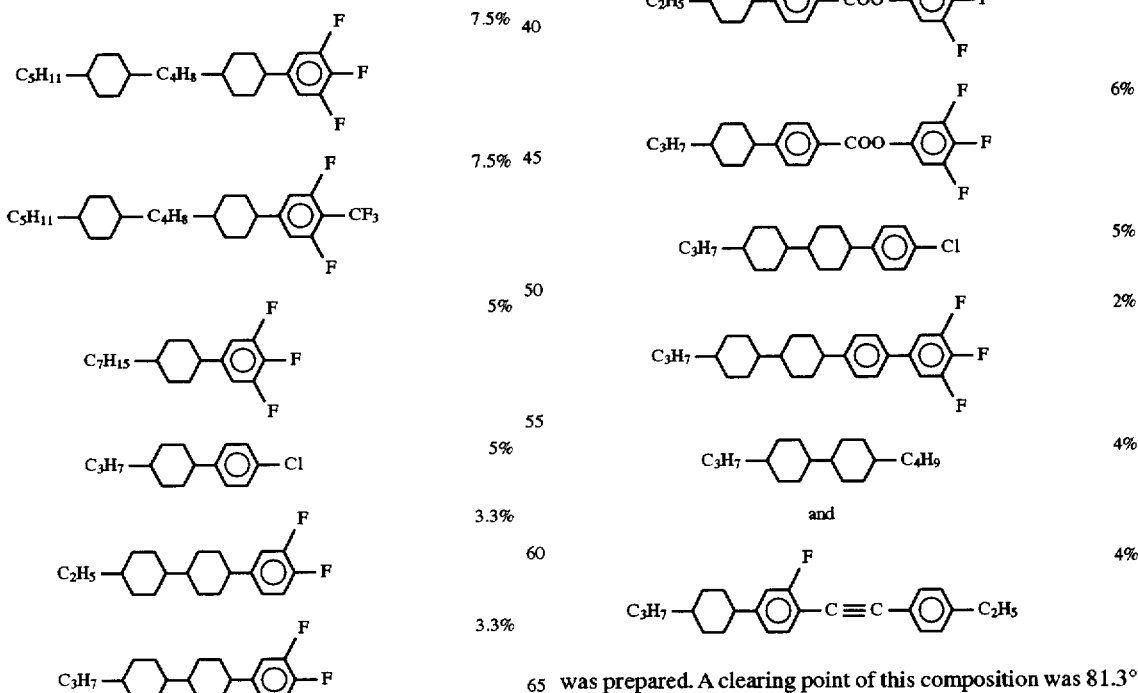

3.4%

2.5%

2.5%

5%

10%

10%

5%

5%

4%

6%

5%

2%

4% and

4% was prepared. A clearing point of this composition was 81.3° C. A viscosity at 20° C., an optical anisotropy at 25° C., a dielectric anisotropy at 20° C., and a threshold voltage at 20°

C., of the composition were 28.7 mPa.s, 0.096, 8.0, and 1.73 V., respectively, and a voltage holding ratio was 98.2% at 25° C.

Example 19

A liquid crystal composition consisting of

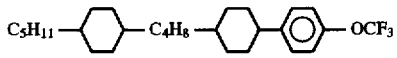 9%

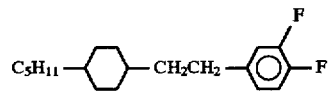 9%

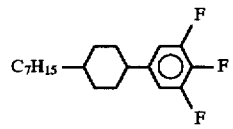 10%

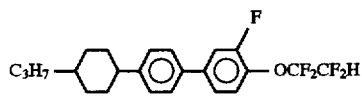 9%

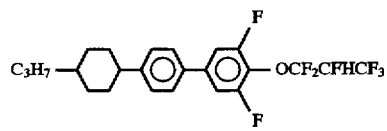 9%

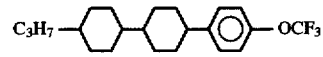 9%

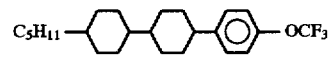 9%

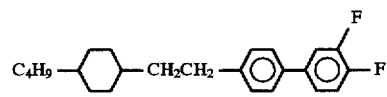 9%

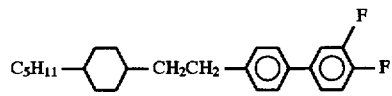 9%

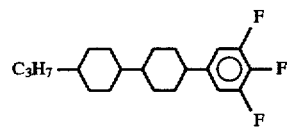 9% and

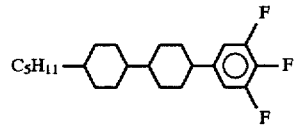 9% was prepared. A clearing point of this composition was 72.4° C. A viscosity at 20° C., an optical anisotropy at 25° C., a dielectric anisotropy at 20° C., and a threshold voltage at 20° C., of the composition were 20.8 mPa.s, 0.091, 5.6, and 1.87 V., respectively, and a voltage holding ratio was 98.2% at 25° C.

Example 20

A liquid crystal composition consisting of

C₅H₁₁—◯—C₄H₈—◯—◯—OCF₃ 7%

C₅H₁₁—◯—CH₂CH₂—◯(F,F) 10%

C₇H₁₅—◯—◯(F,F,F) 10%

C₃H₇—◯—◯—COO—◯—F 10%

C₄H₉—◯—CH₂CH₂—◯(F,F,F) 7%

C₅H₁₁—◯—CH₂CH₂—◯(F,F,F) 7%

C₃H₇—◯—◯—OCF₂CFHCF₃ 7%

C₃H₇—◯—◯—◯(F)—OCF₂CFHCF₃ 7%

C₅H₁₁—◯—◯—OCHF₂ 4%

C₃H₇—◯—COO—◯—OCF₃ 3%

C₅H₁₁—◯—◯—COO—◯—OCF₃ 7%

C₃H₇—◯—◯—COO—◯(F,F)—F 7%

C₂H₅—◯—◯—◯(F)—F 4.7%

C₃H₇—◯—◯—◯(F)—F 4.7% and

C₅H₁₁—◯—◯—◯(F,F)—F 4.6% was prepared. A clearing point of this composition was 72.7° C. A viscosity at 20° C., an optical anisotropy at 25° C., a dielectric anisotropy at 20° C., and a threshold voltage at 20°

C., of the composition were 22.3 mPa.s, 0.092, 5.5, and 1.90 V., respectively, and a voltage holding ratio was 98.2% at 25° C.

Example 21

A liquid crystal composition consisting of

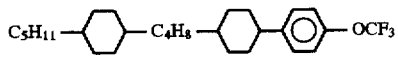 8%

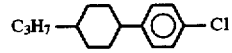 10%

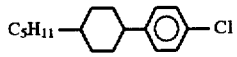 8%

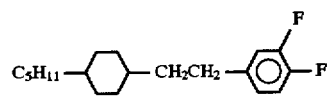 10%

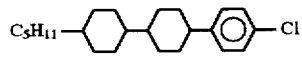 4%

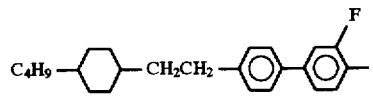 8%

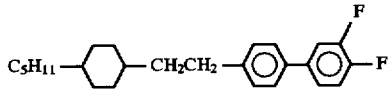 8%

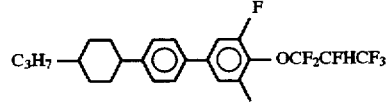 8%

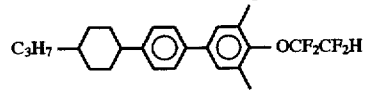 8%

 8% and

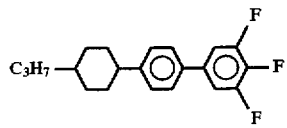 12% was prepared. A clearing point of this composition was 62.2° C. A viscosity at 20° C., an optical anisotropy at 25° C., a dielectric anisotropy at 20° C., and a threshold voltage at 20° C., of the composition were 18.2 mPa.s, 0.100, 5.2, and 1.90 V., respectively, and a voltage holding ratio was 98.4% at 25° C.

Example 22

A liquid crystal composition consisting of

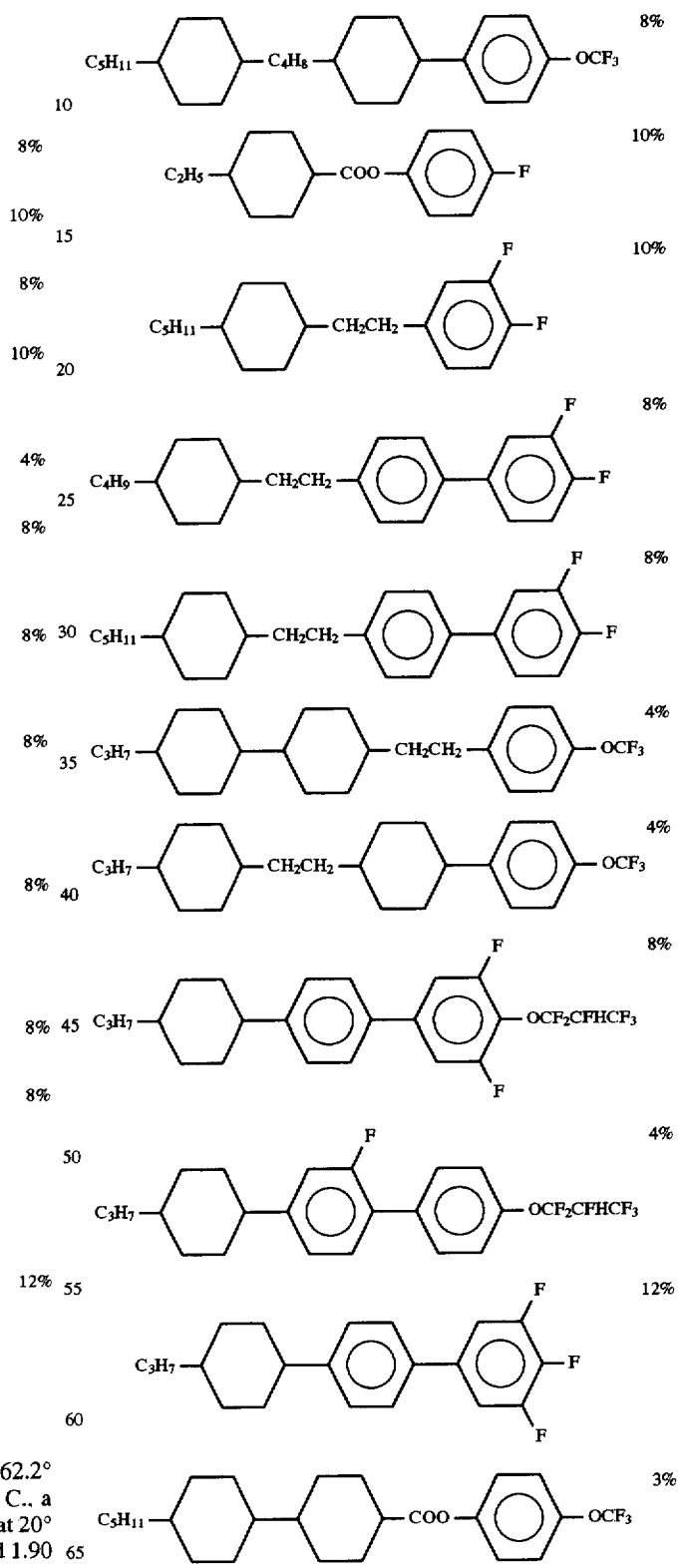

-continued

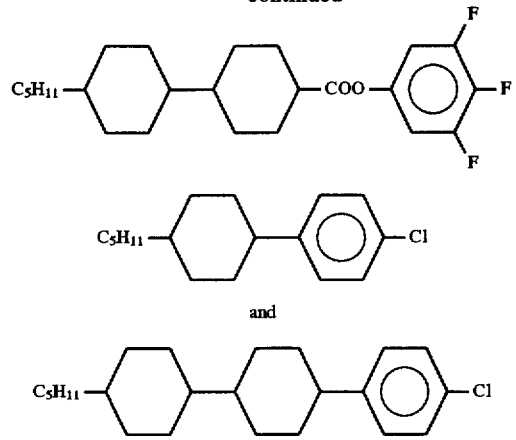

8%

8%

5% was prepared. A clearing point of this composition was 60.6° C. A viscosity at 20° C., an optical anisotropy at 25° C., a dielectric anisotropy at 20° C., and a threshold voltage at 20° C., of the composition were 20.0 mPa.s, 0.092, 5.6, and 1.77 V., respectively, and a voltage holding ratio was 98.3% at 25° C.

Example 23

A liquid crystal composition consisting of

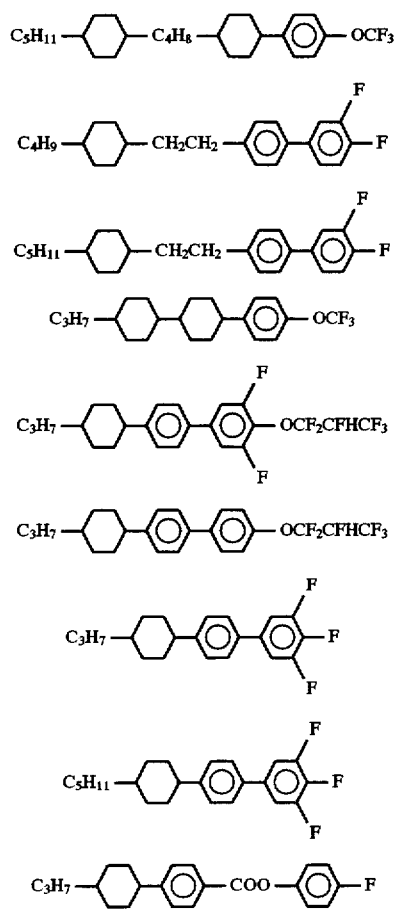

5%
5%
5%
5%
5%
5%
10%
10%
15%

-continued

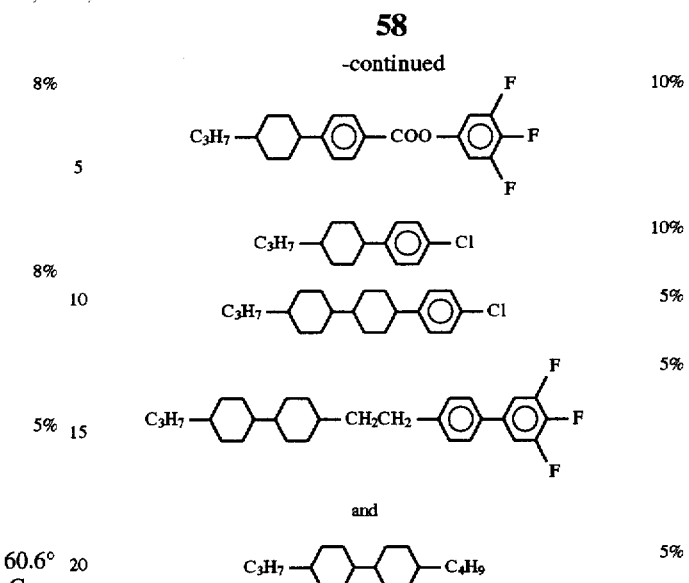

10%
10%
5%
5%
5% was prepared. A clearing point of this composition was 99.1° C. A viscosity at 20° C., an optical anisotropy at 25° C., a dielectric anisotropy at 20° C., and a threshold voltage at 20° C., of the composition were 28.2 mPa.s, 0.119, 8.2, and 1.86 V., respectively, and a voltage holding ratio was 98.3% at 25° C.

Example 24

A liquid crystal composition consisting of

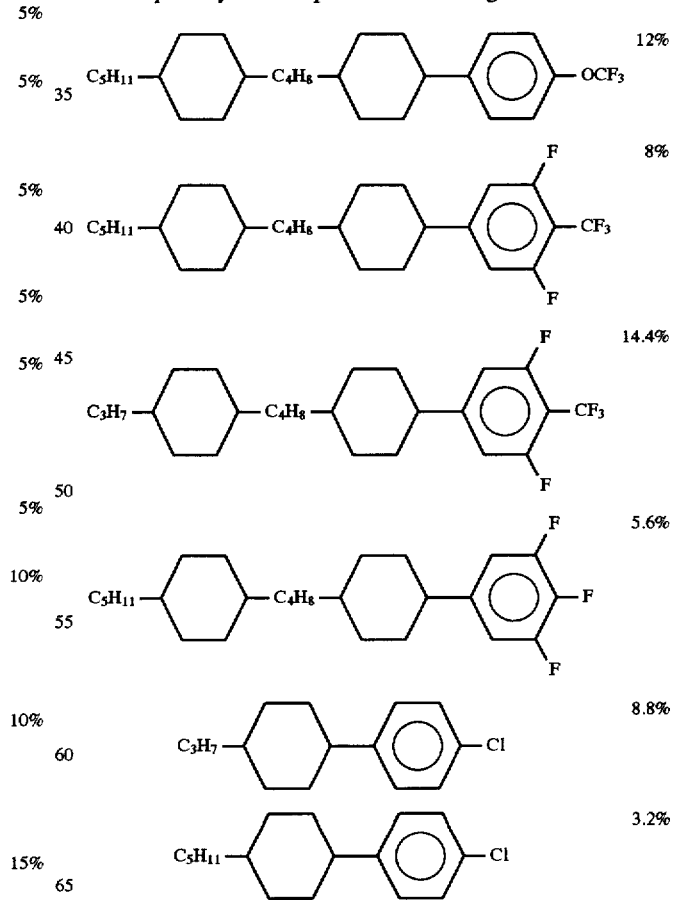

12%
8%
14.4%
5.6%
8.8%
3.2%

-continued

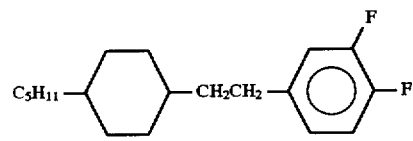  8%  5

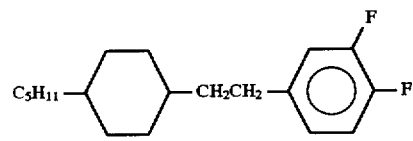  8%  10

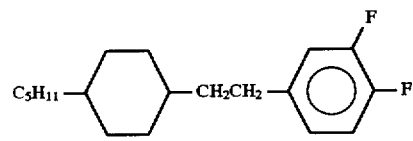  8%  15

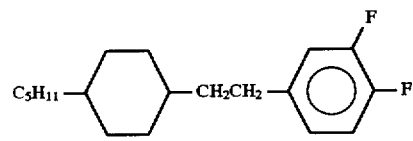  4%  20

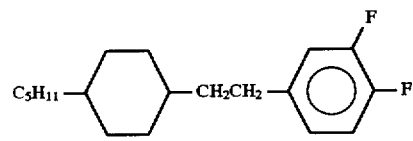  8%  25

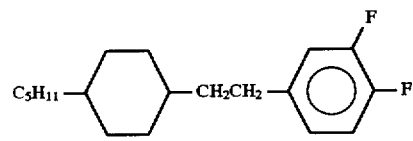  1.6%  30

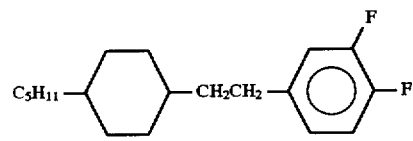  4%  35

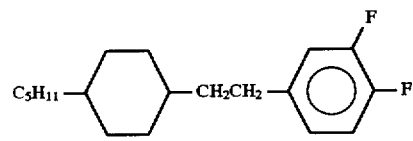  2.4%  40 and

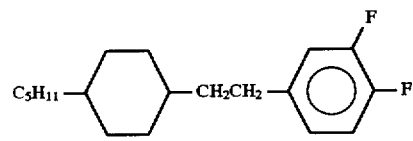  4%  50 was prepared. A clearing point of this composition was 68.2° C. A viscosity at 20° C., an optical anisotropy at 25° C., a dielectric anisotropy at 20° C., and a threshold voltage at 20° C., of the composition were 24.2 mPa.s, 0.092, 7.3, and 1.92 V., respectively, and a voltage holding ratio was 98.4% at 25° C.

Effect of the Invention

As shown in the above examples and comparative example, it becomes possible by the present invention to provide an AM-LCD which may be driven at low voltage and reduced power consumption, a voltage holding ratio being maintained at a high value.

What is claimed is:

1. A liquid crystal composition comprising:
 a first component consisting of at least one compound selected from the group consisting of compounds expressed by general formula (1):

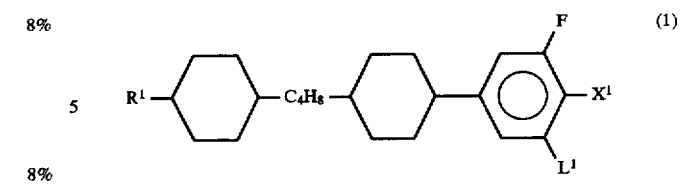

wherein $R^1$ represents an alkyl group of 1 to 10 carbon atoms;

$X^1$ represents F, $CF_3$ or $OCF_3$; and $L^1$ represents H or F, and a second component consisting of at least one compound selected from the group consisting of compounds expressed by any one of general formulas (2), (3), (4), (5), (6) and (7):

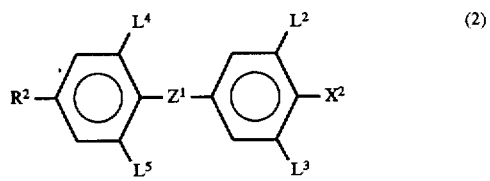

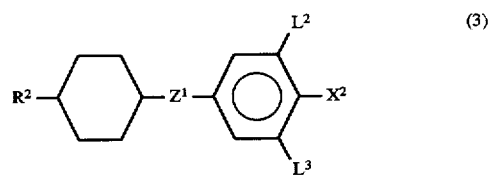

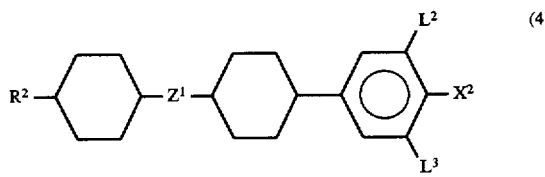

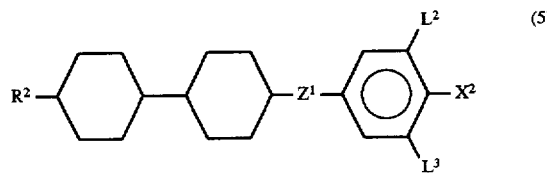

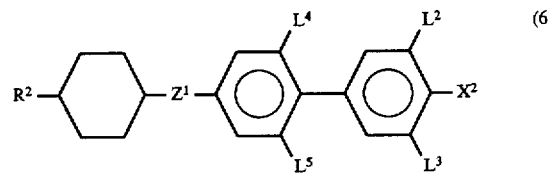

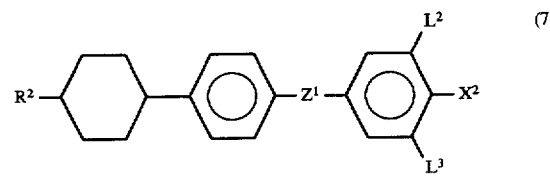

wherein $R^2$ represents an alkyl group of 1 to 10 carbon atoms;

$Z^1$ represents —$CH_2CH_2$— or a single bond; $X^2$ represents F, $CF_3$, $OCHF_2$, $OCF_3$, $OCF_2CHF_2$ or $OCF_2CHFCF_3$; and $L^2$, $L^3$, $L^4$ and $L^5$ represent independently H or F.

2. A liquid crystal composition according to claim 1, wherein mixing proportions of said first and second components are 3–50% and 30–97%, each by weight, respectively, based upon the total weight of said composition.

3. A liquid crystal composition according to claim 1, wherein, in formulas (2)–(7), $X^2$ is F, $OCF_3$, $OCHF_2$, $OCF_2CHF_2$ or $OCF_2CHFCF_3$.

4. A liquid crystal composition according to claim 2, wherein, in formulas (2)–(7), $X^2$ is F, $OCF_3$, $OCHF_2$, $OCF_2CHF_2$ or $OCF_2CHFCF_3$.

5. A liquid crystal composition according to claim 1, further comprising a third component consisting of at least one compound selected from the group consisting of compounds expressed by any one of general formulas (8), (9) and (10):

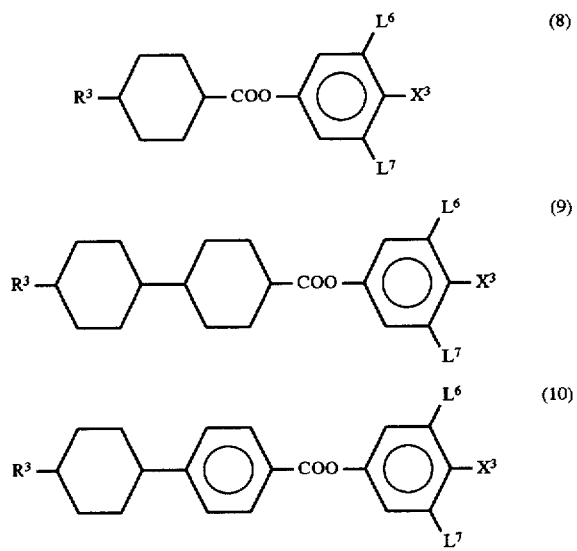

wherein $R^3$ represents an alkyl group of 1 to 10 carbon atoms;

$L^6$ and $L^7$ represent independently H or F; and $X^3$ represents F or $OCF_3$.

6. A liquid crystal composition according to claim 1, further comprising a third component consisting of at least one compound selected from the group consisting of compounds expressed by general formula (11):

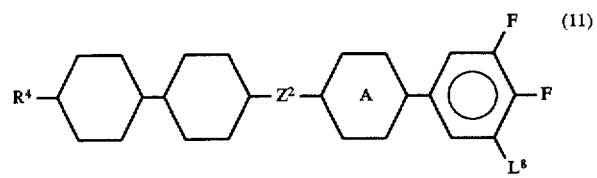

wherein $R^4$ represents an alkyl group of 1 to 10 carbon atoms;

$Z^2$ represents —$CH_2CH_2$— or a single bond; six-membered ring A represents trans-1,4-cyclohexylene or 1,4-phenylene; and $L^8$ represents H or F.

7. A liquid crystal composition according to claim 1, further comprising a third component consisting of at least one compound selected from the group consisting of compounds expressed by general formula (12):

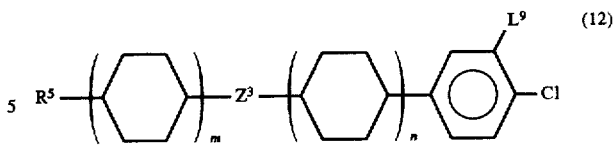

wherein $R^5$ represents an alkyl group of 1 to 10 carbon atoms;

$Z^3$ represents —$CH_2CH_2$— or a single bond; $L^9$ represents H or F;

m and n each represent independently 0 or 1; and (m+n) is 1 or 2.

8. A liquid crystal composition according to claim 1, further comprising a third component consisting of at least one compound selected from the group consisting of compounds expressed by any one of general formulas (13), (14) and (15):

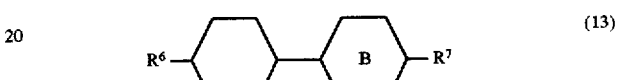

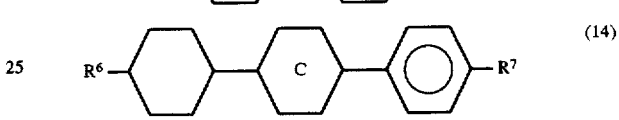

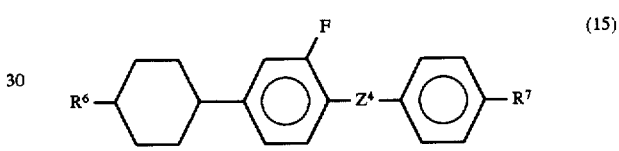

wherein $R^6$ and $R^7$ represent independently an alkyl group, an alkoxy group or an alkoxyalkyl group, each of 1 to 10 carbon atoms; $Z^4$ represents —CH=CH— or —C≡C—; and six-membered rings B and C represent independently trans-1,4-cyclohexylene or 1,4-phenylene.

9. A liquid crystal composition according to claim 5, further comprising a fourth component consisting of at least one compound selected from the group consisting of compounds expressed by general formula (11):

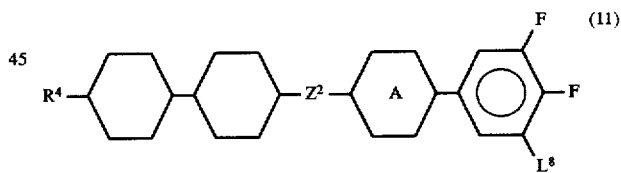

wherein $R^4$ represents an alkyl group of 1 to 10 carbon atoms;

$Z^2$ represents —$CH_2CH_2$— or a single bond; six-membered ring A represents trans-1,4-cyclohexylene or 1,4-phenylene; and $L^8$ represents H or F.

10. A liquid crystal composition according to claim 5, further comprising a fourth component consisting of at least one compound selected from the group consisting of compounds expressed by general formula (12): wherein $R^5$ represents an alkyl group of 1 to 10 carbon atoms;

$Z^3$ represents —$CH_2CH_2$— or a single bond; $L^9$ represents H or F;

m and n each represent independently 0 or 1; and (m+n) is 1 or 2.

11. A liquid crystal composition according to claim 5, further comprising a fourth component consisting of at least one compound selected from the group consisting of compounds expressed by any one of general formulas (13), (14) and (15):

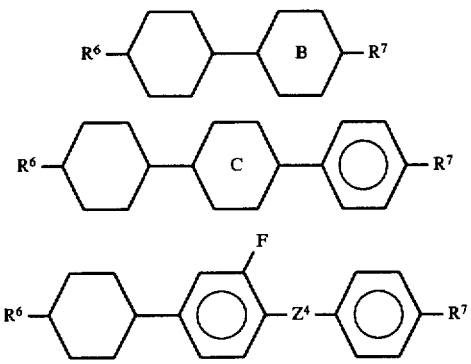

wherein $R^6$ and $R^7$ represent independently an alkyl group, an alkoxy group or an alkoxyalkyl group, each of 1 to 10 carbon atoms; $Z^4$ represents —CH=CH— or —C≡C—; and six-membered rings B and C represent independently trans-1,4-cyclohexylene or 1,4-phenylene.

12. A liquid crystal composition according to claim 9, further comprising a fifth component consisting of at least one compound selected from the group consisting of compounds expressed by general formula (12):

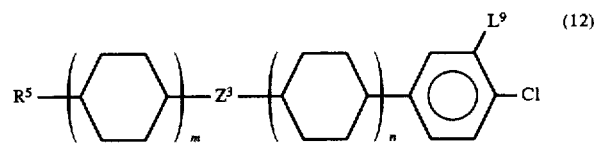

wherein $R^5$ represents an alkyl group of 1 to 10 carbon atoms;

$Z^3$ represents —CH$_2$CH$_2$— or a single bond; $L^9$ represents H or F;

m and n each represent independently 0 or 1; and (m+n) is 1 or 2.

13. A liquid crystal composition according to claim 9, further comprising a fifth component consisting of at least one compound selected from the group consisting of compounds expressed by any one of general formulas (13), (14) and (15):

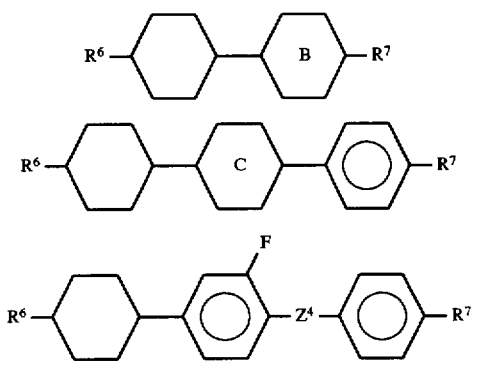

wherein $R^6$ and $R^7$ represent independently an alkyl group, an alkoxy group or an alkoxyalkyl group, each of 1 to 10 carbon atoms; $Z^4$ represents —CH=CH— or —C≡C—; and six-membered rings B and C represent independently trans-1,4-cyclohexylene or 1,4-phenylene.

14. A liquid crystal composition according to claim 10, further comprising a fifth component consisting of at least one compound selected from the group consisting of compounds expressed by any one of general formulas (13), (14) and (15):

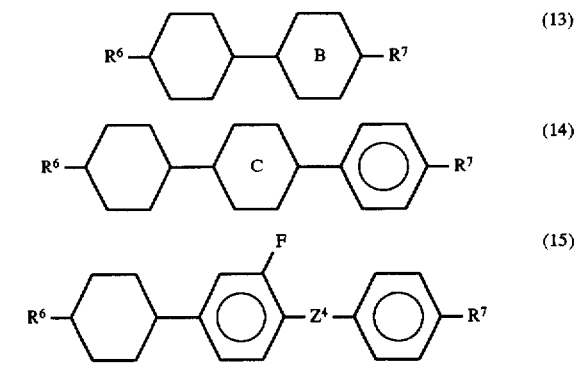

wherein $R^6$ and $R^7$ represent independently an alkyl group, an alkoxy group or an alkoxyalkyl group, each of 1 to 10 carbon atoms; $Z^4$ represents —CH=CH— or —C≡C—; and six-membered rings B and C represent independently trans-1,4-cyclohexylene or 1,4-phenylene.

15. A liquid crystal composition according to claim 12, further comprising a sixth component consisting of at least one compound selected from the group consisting of compounds expressed by any one of general formulas (13), (14) and (15):

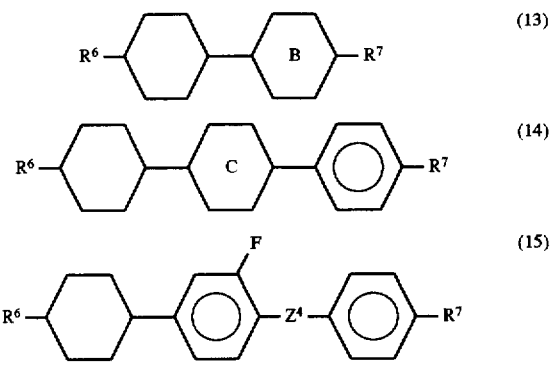

wherein $R^6$ and $R^7$ represent independently an alkyl group, an alkoxy group or an alkoxyalkyl group, each of 1 to 10 carbon atoms; $Z^4$ represents —CH=CH— or —C≡C—; and six-membered rings B and C represent independently trans-1,4-cyclohexylene or 1,4-phenylene.

16. A liquid crystal display device comprising a liquid crystal composition as set forth in any one of claims 1 to 15.

* * * * *